United States Patent
Rhodes et al.

(10) Patent No.: US 10,626,198 B2
(45) Date of Patent: Apr. 21, 2020

(54) POLYCYCLOOLEFIN POLYMER COMPOSITIONS AS OPTICAL MATERIALS

(71) Applicant: PROMERUS, LLC, Brecksville, OH (US)

(72) Inventors: Larry F Rhodes, Brecksville, OH (US); Chad Brick, Brecksville, OH (US); Doug Skilskyj, Brecksville, OH (US)

(73) Assignee: PROMERUS, LLC, Brecksville, OH (US)

( * ) Notice: Subject to any disclaimer, the term of this patent is extended or adjusted under 35 U.S.C. 154(b) by 121 days.

(21) Appl. No.: 15/861,801

(22) Filed: Jan. 4, 2018

(65) Prior Publication Data

US 2018/0194880 A1    Jul. 12, 2018

Related U.S. Application Data

(60) Provisional application No. 62/443,143, filed on Jan. 6, 2017, provisional application No. 62/518,967, filed on Jun. 13, 2017.

(51) Int. Cl.

| | | |
|---|---|---|
| *C08F 32/08* | (2006.01) | |
| *C08F 2/46* | (2006.01) | |
| *C08L 45/00* | (2006.01) | |
| *C09D 165/00* | (2006.01) | |
| *C08G 61/02* | (2006.01) | |
| *C08F 232/00* | (2006.01) | |
| *C08F 232/08* | (2006.01) | |
| *C08F 226/06* | (2006.01) | |
| *C08F 2/48* | (2006.01) | |
| *C09D 145/00* | (2006.01) | |
| *C08F 24/00* | (2006.01) | |
| *C08F 26/06* | (2006.01) | |

(52) U.S. Cl.
CPC .............. *C08F 32/08* (2013.01); *C08F 2/46* (2013.01); *C08F 2/48* (2013.01); *C08F 226/06* (2013.01); *C08F 232/00* (2013.01); *C08F 232/08* (2013.01); *C08L 45/00* (2013.01); *C09D 145/00* (2013.01); *C08F 24/00* (2013.01); *C08F 26/06* (2013.01); *C08L 2203/16* (2013.01)

(58) Field of Classification Search
CPC .......... C08F 32/08; C08F 45/00; C08F 26/06; C08F 2203/16; C08F 2/46; C09D 165/00; C09D 167/02; C09G 61/02; C09G 63/182; C09G 2261/12; C09G 2261/312; C09G 2261/3325
See application file for complete search history.

(56) References Cited

U.S. PATENT DOCUMENTS

| | | | |
|---|---|---|---|
| 2003/0023013 A1 | 1/2003 | Lipian et al. | |
| 2006/0041093 A1* | 2/2006 | Ravikiran | C08G 61/06 526/282 |
| 2017/0058145 A1* | 3/2017 | Rhodes | C08F 232/00 |

FOREIGN PATENT DOCUMENTS

| | | |
|---|---|---|
| EP | 2 676 978 A1 | 12/2013 |
| WO | WO2014/044359 A1 | 3/2014 |
| WO | WO2017/040737 A1 | 3/2017 |

* cited by examiner

*Primary Examiner* — Robert D Harlan
(74) *Attorney, Agent, or Firm* — Balaram Gupta

(57) ABSTRACT

Embodiments in accordance with the present invention encompass compositions encompassing a procatalyst and a thermal or photoactivator along with one or more monomers which undergo vinyl addition polymerization when said composition is heated to a temperature from 50° C. to 100° C. to form a substantially transparent film. The monomers employed therein have a range of refractive index from 1.4 to 1.6 and thus these compositions can be tailored to form transparent films of varied refractive indices. Accordingly, compositions of this invention are useful in various opto-electronic applications, including as coatings, encapsulants, fillers, leveling agents, among others.

20 Claims, No Drawings

POLYCYCLOOLEFIN POLYMER COMPOSITIONS AS OPTICAL MATERIALS

CROSS REFERENCE TO RELATED APPLICATIONS

This application claims the benefit of U.S. Provisional Application No. 62/443,143, filed Jan. 6, 2017; and U.S. Provisional Application No. 62/518,967, filed Jun. 13, 2017; both of which are incorporated herein by reference in their entirety.

BACKGROUND OF THE INVENTION

Field of the Invention

Embodiments in accordance with the present invention relate generally to a single component mass polymerizable polycycloolefin monomer compositions having high optical transparency and exhibiting suitable refractive index that match the refractive index of layers in optical devices, such as optical sensors, light emitting diodes (LEDs), organic light emitting diode (OLED), among other devices. More specifically, this invention relates to single component compositions encompassing norbornene (NB) based olefinic monomers, which undergo mass polymerization to form optical layers having utility in a variety of opto-electronic applications including as encapsulants, coatings, and fillers.

Description of the Art

Organic light emitting diodes (OLEDs) are gaining importance in a variety of applications, including flat panel televisions and other flexible displays, among other applications. However, conventional OLEDs, particularly, bottom emitting OLEDs suffer from a drawback in that only about half of the generated photons are emitted into the glass substrate out of which 25% are extracted into air. The other half of the photons are wave-guided and dissipated in the OLED stack. This loss of photons is primarily attributed to the refractive index (n) mismatch between the organic layers (n=1.7-1.9) and the glass substrate (n=1.5). By matching the refractive index of the substrate (n=1.8) and organic layers and augmenting the distance of the emission zone to the cathode to suppress plasmonic losses light extraction into the substrate can be increased to 80-90%. See, for example, G. Gaertner et al., Proc. Of SPIE, Vol. 6999, 69992T pp 1-12 (2008).

In addition, OLEDs also pose other challenges; in that OLEDs being organic materials, they are generally sensitive to moisture, oxygen, temperature, and other harsh conditions. Thus, it is imperative that OLEDs are protected from such harsh atmospheric conditions. See for example, U. S. Patent Application Publication No. US2012/0009393 A1.

In order to address some of the issues faced by the art, U.S. Pat. No. 8,263,235 discloses use of a light emitting layer formed from at least one organic light emitting material and an aliphatic compound not having an aromatic ring, and a refractive index of the light emitting from 1.4 to 1.6. The aliphatic compounds described therein are generally a variety of polyalkyl ethers, and the like, which are known to be unstable at high temperatures, see for example, Rodriguez et al., I & EC Product Research and Development, Vol. 1, No. 3, 206-210 (1962).

The co-pending U.S. patent application Ser. No. 15/253,980, filed Sep. 1, 2016, discloses a two component mass polymerizable composition which is capable of tailoring to the desirable refractive index and is suitable as a filler and a protective coating material, thus potentially useful in the fabrication of a variety of OLED devices.

However, there is still a need for organic filler materials that complement the refractive index of OLEDs and yet exhibit high transparency and good thermal properties, among other desirable properties. In addition, it is desirable that such organic filler materials readily form a permanent protective coatings and are available as a single component composition for dispensing with such OLED layers.

Thus, it is an object of this invention to provide organic materials that overcome the gaps faced by the art. More specifically, it is an object of this invention to provide a single component composition that will mass polymerize under the conditions of the fabrications of an OLED device. It is further an object of this invention to provide stable single component mass polymerizable composition with no change in viscosity at or below normal storage conditions but which undergoes mass polymerization only under the process conditions in which the OLED device is finally fabricated, such as for example by the use of radiation and/or thermal process.

Other objects and further scope of the applicability of the present invention will become apparent from the detailed description that follows.

SUMMARY OF THE INVENTION

Surprisingly, it has now been found that by employing a single component filler composition, it is now possible to fabricate an OLED device having a transparent optical layer which features hitherto unachievable properties, i.e., refractive index in the range of 1.4 to 1.6 or higher, high colorless optical transparency, desirable film thickness of the filler layer typically in the range of 10 to 20 μm but can be tailored to lower or higher film thickness depending upon the intended application, compatible with the OLED stack, particularly the cathode layer (a very thin layer on the top of the OLED stack), compatible with polymerization of the formulation on the OLED stack, including fast polymerization time and can be photolytically or thermally treated at less than 100° C., adhesion to both OLED stack and glass cover, and the like. It is also important to note that the compositions of this invention are expected to exhibit good uniform leveling across the OLED layer which typically requires a low viscosity. Further, compositions of this invention are also expected to exhibit low shrinkage due to their rigid polycycloolefinic structure. In addition, as the components of this invention undergo fast mass polymerization upon application they do not leave behind any fugitive small molecules which can damage the OLED stack. Generally, no other small molecule additives need to be employed thus offering additional advantages. Most importantly, the compositions of this invention are stable (i. e., no change in viscosity) at ambient atmospheric conditions including up to 35° C. for several hours, and undergo mass polymerization only above 50° C. or higher temperature. The compositions cure very quickly when subjected to higher than 50° C. and generally the compositions are cured in less than one hour.

Advantageously, the compositions of this invention are also compatible with a "one drop fill" (commonly known as "ODF"). In a typical ODF process, which is commonly used to fabricate a top emission OLED device, a special optical fluid is applied to enhance the transmission of light from the device to the top cover glass, and the fluid is dispensed by an ODF method. Although the method is known as ODF which can be misleading because several drops or lines of material are generally dispensed inside the seal lines. After applying the fluid, the fluid spreads out as the top glass is laminated, analogous to die-attach epoxy. This process is generally carried out under vacuum to prevent air entrapment. The present invention allows for a material of low viscosity which readily and uniformly coats the substrate with rapid flow in a short period of time. Even more advantageously, the present invention overcomes the deficiencies faced by the prior art in that a single component composition is much more convenient than employing a two component system especially in an ODF method.

Accordingly, there is provided a single component composition encompassing one or more monomers of formula (I) or formula (II), a procatalyst and a thermal or photo activator, wherein:

a) said monomer of formula (I) is:

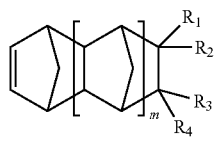
(I)

wherein:
m is an integer 0, 1 or 2;
at least one of $R_1$, $R_2$, $R_3$ and $R_4$ is selected from the group consisting of:
a group of formula (A):

—X-Aryl  (A);

a group of formula (A1):

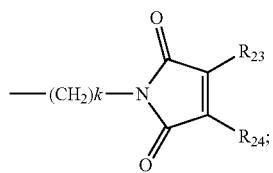
(A1)

a group of formula (A2):

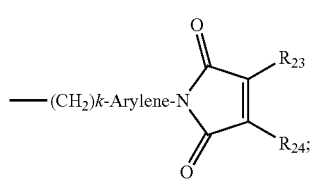
(A2)

a group of formula (A3):

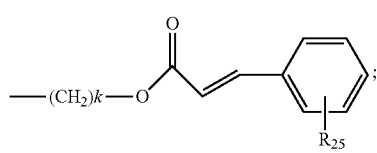
(A3)

and a group of formula (A4):

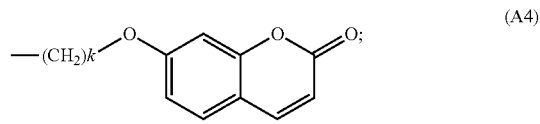
(A4)

wherein:
X is selected from the group consisting of:
O, CO, C(O)O, OC(O), OC(O)O, S, $(CR_5R_6)_a$, $O(CR_5R_6)_a$, $(CR_5R_6)_aO$, $C(O)(CR_5R_6)_a$, $(CR_5R_6)_aC(O)$, $C(O)O(CR_5R_6)_a$, $(CR_5R_6)_aC(O)O$, $OC(O)(CR_5R_6)_a$, $(CR_5R_6)_aOC(O)$, $(CR_5R_6)_aOC(O)O$, $(CR_5R_6)_aOC(O)O(CR_5R_6)_a$, $OC(O)O(CR_5R_6)_a$, $S(CR_5R_6)_a$, $(CR_5R_6)_aS$, $(SiR_5R_6)_a$, $O(SiR_5R_6)_a$, $(SiR_5R_6)_aO$, where $R_5$ and $R_6$ are the same or different and each independently selected from hydrogen, methyl, ethyl, linear or branched $(C_3-C_{12})$alkyl and substituted or unsubstituted $(C_6-C_{14})$aryl, and a is an integer from 0 to 12, inclusive;

Aryl is substituted or unsubstituted biphenyl, substituted or unsubstituted naphthyl substituted or unsubstituted terphenyl, substituted or unsubstituted anthracenyl substituted or unsubstituted fluorenyl;

k is an integer from 1 to 12;

$R_{23}$, $R_{24}$ and $R_{25}$ are the same or different and each independently selected from the group consisting of hydrogen, methyl, ethyl, linear or branched $(C_3-C_{12})$alkyl, perfluoro$(C_1-C_{12})$alkyl, methoxy, ethoxy, linear or branched $(C_3-C_{12})$alkoxy, $(C_3-C_{12})$cycloalkyl, $(C_6-C_{12})$bicycloalkyl, $(C_7-C_{14})$tricycloalkyl, $(C_6-C_{10})$aryl, $(C_6-C_{10})$aryl$(C_1-C_6)$alkyl, perfluoro$(C_6-C_{10})$aryl and perfluoro$(C_6-C_{10})$aryl$(C_1-C_3)$alkyl; or $R_{23}$ and $R_{24}$ taken together with the intervening carbon atoms to which they are attached to form a substituted or unsubstituted $(C_5-C_{14})$cyclic, $(C_5-C_{14})$bicyclic or $(C_5-C_{14})$tricyclic ring; and Arylene is substituted or unsubstituted bivalent $(C_6-C_{14})$aryl;

the remaining $R_1$, $R_2$, $R_3$ and $R_4$ are the same or different and each independently selected from the group consisting of hydrogen, halogen, a hydrocarbyl or halohydrocarbyl group selected from methyl, ethyl, linear or branched $(C_3-C_{12})$alkyl, perfluoro$(C_1-C_{12})$alkyl, $(C_3-C_{12})$cycloalkyl, $(C_6-C_{12})$bicycloalkyl, $(C_7-C_{14})$tricycloalkyl, $(C_6-C_{10})$aryl, $(C_6-C_{10})$aryl$(C_1-C_6)$alkyl, perfluoro$(C_6-C_{10})$aryl and perfluoro$(C_6-C_{10})$aryl$(C_1-C_3)$alkyl; or one of $R_1$ and $R_2$ taken together with one of $R_3$ and $R_4$ and the carbon atoms to which they are attached to form a substituted or unsubstituted $(C_5-C_{14})$cyclic, $(C_5-C_{14})$bicyclic or $(C_5-C_{14})$tricyclic ring;

b) said monomer of formula (II) is:

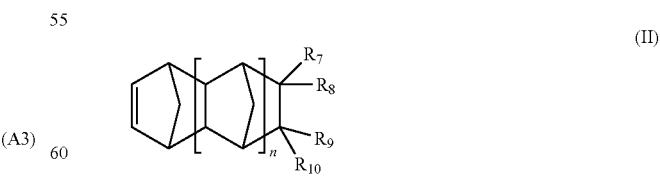
(II)

wherein:
n is an integer 0, 1 or 2;
$R_7$, $R_8$, $R_9$ and $R_{10}$ are the same or different and each independently selected from the group consisting of hydrogen, halogen, a hydrocarbyl or halohydrocarbyl group selected from methyl, ethyl, linear or branched $(C_3\text{-}C_{16})$ alkyl, perfluoro$(C_1\text{-}C_{12})$alkyl, $(C_3\text{-}C_{12})$cycloalkyl, $(C_6\text{-}C_{12})$ bicycloalkyl, $(C_7\text{-}C_{14})$tricycloalkyl, $(C_6\text{-}C_{10})$aryl, $(C_6\text{-}C_{10})$ aryl$(C_1\text{-}C_6)$alkyl, perfluoro$(C_6\text{-}C_{10})$aryl, perfluoro$(C_6\text{-}C_{10})$ aryl$(C_1\text{-}C_3)$alkyl and a group of formula (B):

wherein:

Y is $(CR_5R_6)_a$, $O(CR_5R_6)_a$, $(CR_5R_6)_aO$, where a, $R_5$ and $R_6$ are as defined above;

$Aryl_1$ is phenyl or phenyl substituted with one or more $(C_1\text{-}C_6)$alkyl;

and wherein said monomer of formula (I) is having a refractive index of at least 1.5 and said composition is in a clear liquid form at room temperature.

In another aspect of this invention there is also provided a kit encompassing the composition of this invention for forming a transparent film.

DETAILED DESCRIPTION

The terms as used herein have the following meanings:

As used herein, the articles "a," "an," and "the" include plural referents unless otherwise expressly and unequivocally limited to one referent.

Since all numbers, values and/or expressions referring to quantities of ingredients, reaction conditions, etc., used herein and in the claims appended hereto, are subject to the various uncertainties of measurement encountered in obtaining such values, unless otherwise indicated, all are to be understood as modified in all instances by the term "about."

Where a numerical range is disclosed herein such range is continuous, inclusive of both the minimum and maximum values of the range as well as every value between such minimum and maximum values. Still further, where a range refers to integers, every integer between the minimum and maximum values of such range is included. In addition, where multiple ranges are provided to describe a feature or characteristic, such ranges can be combined. That is to say that, unless otherwise indicated, all ranges disclosed herein are to be understood to encompass any and all sub-ranges subsumed therein. For example, a stated range of from "1 to 10" should be considered to include any and all sub-ranges between the minimum value of 1 and the maximum value of 10. Exemplary sub-ranges of the range 1 to 10 include, but are not limited to, 1 to 6.1, 3.5 to 7.8, and 5.5 to 10, etc.

As used herein, the symbol "~~~" denotes a position at which the bonding takes place with another repeat unit or another atom or molecule or group or moiety as appropriate with the structure of the group as shown.

As used herein, "hydrocarbyl" refers to a group that contains carbon and hydrogen atoms, non-limiting examples being alkyl, cycloalkyl, aryl, aralkyl, alkaryl, and alkenyl. The term "halohydrocarbyl" refers to a hydrocarbyl group where at least one hydrogen has been replaced by a halogen. The term perhalocarbyl refers to a hydrocarbyl group where all hydrogens have been replaced by a halogen.

As used herein, the expression "$(C_1\text{-}C_6)$alkyl" includes methyl and ethyl groups, and straight-chained or branched propyl, butyl, pentyl and hexyl groups. Particular alkyl groups are methyl, ethyl, n-propyl, isopropyl and tert-butyl. Derived expressions such as "$(C_1\text{-}C_4)$alkoxy", "$(C_1\text{-}C_4)$ thioalkyl" "$(C_1\text{-}C_4)$alkoxy$(C_1\text{-}C_4)$alkyl", "hydroxy$(C_1\text{-}C_4)$ alkyl", "$(C_1\text{-}C_4)$alkylcarbonyl", "$(C_1\text{-}C_4)$alkoxycarbonyl $(C_1\text{-}C_4)$alkyl", "$(C_1\text{-}C_4)$alkoxycarbonyl", "diphenyl$(C_1\text{-}C_4)$ alkyl", "phenyl$(C_1\text{-}C_4)$alkyl", "phenylcarboxy$(C_1\text{-}C_4)$alkyl" and "phenoxy$(C_1\text{-}C_4)$alkyl" are to be construed accordingly.

As used herein, the expression "cycloalkyl" includes all of the known cyclic groups. Representative examples of "cycloalkyl" includes without any limitation cyclopropyl, cyclobutyl, cyclopentyl, cyclohexyl, cycloheptyl, cyclooctyl, and the like. Derived expressions such as "cycloalkoxy", "cycloalkylalkyl", "cycloalkylaryl", "cycloalkylcarbonyl" are to be construed accordingly.

As used herein, the expression "$(C_1\text{-}C_6)$perfluoroalkyl" means that all of the hydrogen atoms in said alkyl group are replaced with fluorine atoms. Illustrative examples include trifluoromethyl and pentafluoroethyl, and straight-chained or branched heptafluoropropyl, nonafluorobutyl, undecafluoropentyl and tridecafluorohexyl groups. Derived expression, "$(C_1\text{-}C_6)$perfluoroalkoxy", is to be construed accordingly. It should further be noted that certain of the alkyl groups as described herein, such as for example, "$(C_1\text{-}C_6)$ alkyl" may partially be fluorinated, that is, only portions of the hydrogen atoms in said alkyl group are replaced with fluorine atoms and shall be construed accordingly.

As used herein, the expression "$(C_6\text{-}C_{10})$aryl" means substituted or unsubstituted phenyl or naphthyl. Specific examples of substituted phenyl or naphthyl include o-, p-, m-tolyl, 1,2-, 1,3-, 1,4-xylyl, 1-methylnaphthyl, 2-methylnaphthyl, etc. "Substituted phenyl" or "substituted naphthyl" also include any of the possible substituents as further defined herein or one known in the art.

As used herein, the expression "$(C_6\text{-}C_{10})$aryl$(C_1\text{-}C_4)$ alkyl" means that the $(C_6\text{-}C_{10})$aryl as defined herein is further attached to $(C_1\text{-}C_4)$alkyl as defined herein. Representative examples include benzyl, phenylethyl, 2-phenylpropyl, 1-naphthylmethyl, 2-naphthylmethyl and the like.

"Halogen" or "halo" means chloro, fluoro, bromo, and iodo.

In a broad sense, the term "substituted" is contemplated to include all permissible substituents of organic compounds. In a few of the specific embodiments as disclosed herein, the term "substituted" means substituted with one or more substituents independently selected from the group consisting of $(C_1\text{-}C_6)$alkyl, $(C_2\text{-}C_6)$alkenyl, $(C_1\text{-}C_6)$perfluoroalkyl, phenyl, hydroxy, —$CO_2H$, an ester, an amide, $(C_1\text{-}C_6)$ alkoxy, $(C_1\text{-}C_6)$thioalkyl and $(C_1\text{-}C_6)$perfluoroalkoxy. However, any of the other suitable substituents known to one skilled in the art can also be used in these embodiments.

It should be noted that any atom with unsatisfied valences in the text, schemes, examples and tables herein is assumed to have the appropriate number of hydrogen atom(s) to satisfy such valences.

By the term "derived" is meant that the polymeric repeating units are polymerized (formed) from, for example, polycyclic norbornene-type monomers in accordance with formulae (I) to (IV) wherein the resulting polymers are formed by 2,3 enchainment of norbornene-type monomers as shown below:

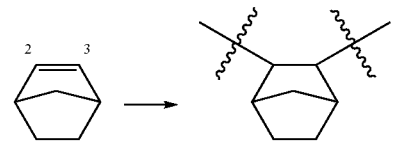

Accordingly, in accordance with the practice of this invention there is provided a single component composition encompassing one or more monomers of formula (I) or formula (II), a procatalyst and a thermal or photoactivator, wherein:

a) said monomer of formula (I) is:

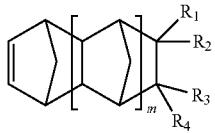
(I)

wherein:
m is an integer 0, 1 or 2;
at least one of $R_1$, $R_2$, $R_3$ and $R_4$ is selected from the group consisting of:
a group of formula (A):

—X-Aryl  (A);

a group of formula (A1):

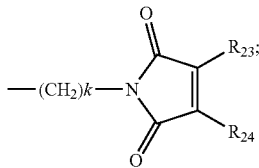
(A1)

a group of formula (A2):

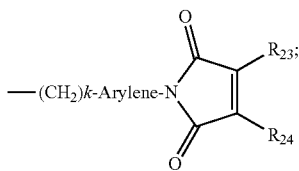
(A2)

a group of formula (A3):

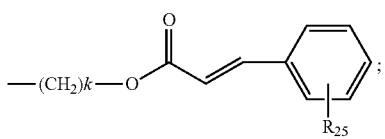
(A3)

and
a group of formula (A4):

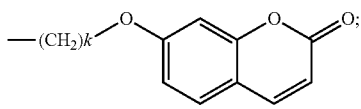
(A4)

wherein:
X is selected from the group consisting of:
O, CO, C(O)O, OC(O), OC(O)O, S, $(CR_5R_6)_a$, $O(CR_5R_6)_a$, $(CR_5R_6)_aO$, $C(O)(CR_5R_6)_a$, $(CR_5R_6)_aC(O)$, $C(O)O(CR_5R_6)_a$, $(CR_5R_6)_aC(O)O$, $OC(O)(CR_5R_6)_a$, $(CR_5R_6)_aOC(O)$, $(CR_5R_6)_aOC(O)O$, $(CR_5R_6)_aOC(O)O(CR_5R_6)_a$, $OC(O)O(CR_5R_6)_a$, $S(CR_5R_6)_a$, $(CR_5R_6)_aS$, $(SiR_5R_6)_a$, $O(SiR_5R_6)_a$, $(SiR_5R_6)_aO$, where $R_5$ and $R_6$ are the same or different and each independently selected from hydrogen, methyl, ethyl, linear or branched ($C_3$-$C_{12}$)alkyl and substituted or unsubstituted ($C_6$-$C_{14}$)aryl, and a is an integer from 0 to 12, inclusive;

Aryl is substituted or unsubstituted biphenyl of formula:

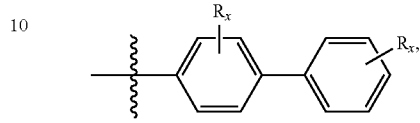

substituted or unsubstituted naphthyl of formula:

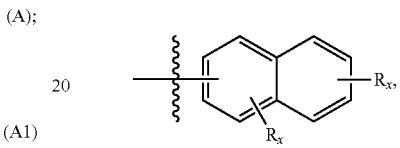

substituted or unsubstituted terphenyl of formula:

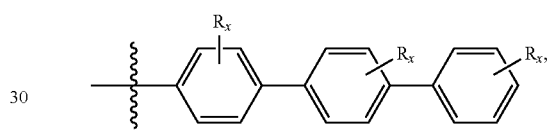

substituted or unsubstituted anthracenyl of formula:

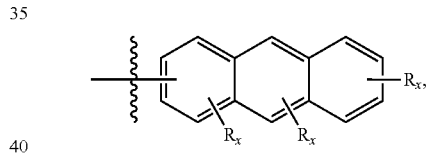

substituted or unsubstituted fluorenyl of formula:

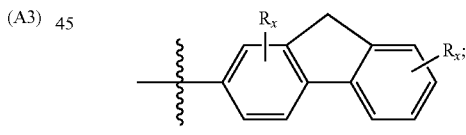

where $R_x$ in each occurrence is independently selected from methyl, ethyl, linear or branched ($C_3$-$C_{12}$)alkyl or ($C_6$-$C_{10}$)aryl;
k is an integer from 1 to 12;
$R_{23}$, $R_{24}$ and $R_{25}$ are the same or different and each independently selected from the group consisting of hydrogen, methyl, ethyl, linear or branched ($C_3$-$C_{12}$)alkyl, perfluoro($C_1$-$C_{12}$)alkyl, methoxy, ethoxy, linear or branched ($C_3$-$C_{12}$)alkoxy, ($C_3$-$C_{12}$)cycloalkyl, ($C_6$-$C_{12}$)bicycloalkyl, ($C_7$-$C_{14}$)tricycloalkyl, ($C_6$-$C_{10}$)aryl, to ($C_6$-$C_{10}$)aryl($C_1$-$C_6$)alkyl, perfluoro($C_6$-$C_{10}$)aryl and perfluoro($C_6$-$C_{10}$)aryl($C_1$-$C_3$)alkyl; or
$R_{23}$ and $R_{24}$ taken together with the intervening carbon atoms to which they are attached to form a substituted or unsubstituted ($C_5$-$C_{14}$)cyclic, ($C_5$-$C_{14}$)bicyclic or ($C_5$-$C_{14}$) tricyclic ring; and Arylene is substituted or unsubstituted bivalent ($C_6$-$C_{14}$)aryl;

the remaining $R_1$, $R_2$, $R_3$ and $R_4$ are the same or different and each independently selected from the group consisting of hydrogen, halogen, a hydrocarbyl or halohydrocarbyl group selected from methyl, ethyl, linear or branched ($C_3$-$C_{12}$)alkyl, perfluoro($C_1$-$C_{12}$)alkyl, ($C_3$-$C_{12}$)cycloalkyl, ($C_6$-$C_{12}$)bicycloalkyl, ($C_7$-$C_{14}$)tricycloalkyl, ($C_6$-$C_{10}$)aryl, ($C_6$-$C_{10}$)aryl($C_1$-$C_6$)alkyl, perfluoro($C_6$-$C_{10}$)aryl or perfluoro($C_6$-$C_{10}$)aryl($C_1$-$C_3$)alkyl; or one of $R_1$ and $R_2$ taken together with one of $R_3$ and $R_4$ and the carbon atoms to which they are attached to form a substituted or unsubstituted ($C_5$-$C_{14}$)cyclic, ($C_5$-$C_{14}$)bicyclic or ($C_5$-$C_{14}$)tricyclic ring;

b) said monomer of formula (II) is:

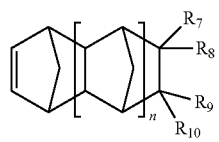

(II)

wherein:

n is an integer 0, 1 or 2;

$R_7$, $R_8$, $R_9$ and $R_{10}$ are the same or different and each independently selected from the group consisting of hydrogen, halogen, a hydrocarbyl or halohydrocarbyl group selected from methyl, ethyl, linear or branched ($C_3$-$C_{16}$) alkyl, perfluoro($C_1$-$C_{12}$)alkyl, ($C_3$-$C_{12}$)cycloalkyl, ($C_6$-$C_{12}$) bicycloalkyl, ($C_7$-$C_{14}$)tricycloalkyl, ($C_6$-$C_{10}$)aryl, ($C_6$-$C_{10}$) aryl($C_1$-$C_6$)alkyl, perfluoro($C_6$-$C_{10}$)aryl, perfluoro($C_6$-$C_{10}$) aryl($C_1$-$C_3$)alkyl and a group of formula (B):

  (B)

wherein:

Y is $(CR_5R_6)_a$, $O(CR_5R_6)_a$, $(CR_5R_6)_aO$, where a, $R_5$ and $R_6$ are as defined above;

$Aryl_1$ is phenyl or phenyl substituted with one or more ($C_1$-$C_6$)alkyl;

and wherein said monomer of formula (I) is having a refractive index of at least 1.5 and said composition is in a clear liquid form at room temperature.

The monomers employed in the composition of this invention are themselves known in the literature or can be prepared by any of the known methods in the art to make such or similar types of monomers.

In addition, the monomers as described herein readily undergo mass polymerization, i.e., in their neat form without use of any solvents by vinyl addition polymerization using transition metal procatalysts, such as for example, nickel, palladium or platinum. See for example, U.S. Pat. Nos. 6,455,650; 6,825,307; and 7,910,674; pertinent portions of which are incorporated herein by reference. The term "mass polymerization" as used herein shall have the generally accepted meaning in the art. That is, a polymerization reaction that is generally carried out substantially in the absence of a solvent. In some cases, however, a small proportion of solvent is present in the reaction medium. For example, such small amounts of solvent may be used to dissolve the procatalyst and/or the activator or convey the same to the reaction medium. Also, some solvent may be used to reduce the viscosity of the monomer. The amount of solvent that can be used in the reaction medium may be in the range of 0 to 5 weight percent based on the total weight of the monomers employed. Any of the suitable solvents that dissolves the catalyst, activator and/or monomers can be employed in this invention. Examples of such solvents include alkanes, cycloalkane, THF, dichloromethane, dichloroethane, and the like.

Advantageously, it has now been found that one or more of the monomers themselves can be used to dissolve the procatalyst as well as the activator and thus avoiding the need for the use of solvents. In addition, one monomer can itself serve as a solvent for the other monomer and thus eliminating the need for an additional solvent. For example, if a monomer of formula (I) is a solid at room temperature, then a monomer of formula (II) (or even a different monomer of formula (I)), which is liquid at room temperature can be used as a solvent for the monomer of formula (I) which is a solid or vice versa. Therefore, in such situations more than one monomer can be employed in the composition of this invention.

Accordingly, it has now been surprisingly found that monomers of formula (I) serve as high refractive index materials imparting high refractive index to the resulting polymeric film upon mass polymerization at a temperature and/or condition different from the application of the composition onto a desirable substrate. Thus, monomers of formula (I) as used herein may be termed as "Refractive index modifier" of the composition of this invention. In general, the monomers of formula (I) which are suitable in this invention feature a refractive index of at least 1.5. In some embodiments the refractive index of the monomers of formula (I) is higher than 1.5. In some other embodiments the refractive index of the monomers of formula (I) is in the range from about 1.5 to 1.6. In yet some other embodiments the refractive index of the monomers of formula (I) is higher than 1.55, higher than 1.6 or higher than 1.65. In some other embodiments it may even be higher than 1.7.

Now, turning to monomer of formula (II), it is generally contemplated that monomer of formula (II), if employed, serves as a viscosity modifier. Accordingly, in general, monomer of formula (II) is a liquid at room temperature and can be used in conjunction with monomer of formula (I) which can be a solid, high viscosity liquid and/or a low viscosity liquid. Although it is also possible that in some cases monomer of formula (I) is a low viscosity liquid which can be used in combination with a high viscosity liquid of monomer of formula (II). Accordingly, all such combinations are part of this invention.

In a further embodiment of this invention the composition of this invention encompasses at least two monomers wherein first monomer is of formula (I) and a second monomer is of formula (II). As noted, the monomer of formula (II) can exhibit a refractive index less than 1.6. In some embodiments, the refractive index of the monomers of formula (II) is less than 1.59. In some other embodiments the refractive index of the monomers of formula (II) is in the range from about 1.4 to 1.6. In yet some other embodiments the refractive index of the monomers of formula (II) is lower than 1.55, lower than 1.5 or lower than 1.45. In some other embodiments it may even be lower than 1.4.

In general, the composition of this invention exhibits low viscosity, which can be below 100 centipoise. In some embodiments, the viscosity of the composition of this invention is less than 90 centipoise. In some other embodiments the viscosity of the composition of this invention is in the range from about 10 to 100 centipoise. In yet some other embodiments the viscosity of the composition of this invention is lower than 80 cP, lower than 60 cP, lower than 40 cP, lower than 20 cP. In some other embodiments it may even be lower than 20 cP.

When the composition of this invention contains two monomers, for example, the monomer of formula (I) and the monomer of formula (II), they can be present in any desirable amounts that would bring about intended benefit, including either refractive index modification or viscosity modification or both. Accordingly, the molar ratio of monomer (I) to monomer (II) can be from 0:100 to 100:0. That is, only monomer of formula (I) or monomer of formula (II) can be employed in certain applications. In other words, any amount of these two monomers can be employed. In some embodiments, the molar ratio of monomer of formula (*monomer of formula (II) is in the range from 5:95 to 95:5; in some other embodiments it is from 10:90 to 90:10; it is from 20:80 to 80:20; it is from 30:70 to 70:30; it is from 60:40 to 40:60; and it is 50:50, and so on.

In general, the compositions in accordance with the present invention encompass the above described one or more of the monomer of formula (I) and if needed one or more monomer of formula (II), as it will be seen below, various composition embodiments are selected to provide properties to such embodiments that are appropriate and desirable for the use for which such embodiments are directed, thus such embodiments are tailorable to a variety of specific applications.

For example, as already discussed above, proper combination of monomers of formula (I) and monomers of formula (II) makes it possible to tailor a composition having the desirable refractive index, viscosity and optical transmission properties. In addition, it may be desirable to include other polymeric or monomeric materials which are compatible to provide desirable optical properties depending upon the end use application. Accordingly, the compositions of this invention can also include other high refractive polymeric materials which will bring about such intended benefit. Examples of such polymers include without any limitation, poly(α-methylstyrene), poly(vinyl-toluene), copolymers of α-methylstyrene and vinyl-toluene, and the like.

Advantageously, it has further been found that the compositions of this invention can also contain additional monomers. In some embodiments, the composition according to this invention may further contain one or more monomers selected from monomer of formula (III) or monomer of formula (IV).

The monomer of formula (III) is:

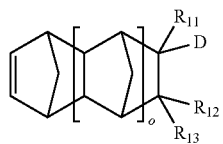

(III)

wherein:
o is an integer from 0 to 2, inclusive;
D is $SiR_{14}R_{15}R_{16}$ or a group selected from:

 (E);

 (F); and

 (G); wherein c is an integer from 1 to 10, inclusive, and where one or more of $CH_2$ is optionally substituted with $(C_1-C_{10})$alkyl, $(C_1-C_{10})$perfluoroalkyl or $(C_6-C_{14})$aryl;

$R_{11}$, $R_{12}$ and $R_{13}$ are the same or different and independently of each other selected from hydrogen, halogen and hydrocarbyl, where hydrocarbyl is selected from methyl, ethyl, linear or branched $(C_3-C_{12})$alkyl, $(C_3-C_{12})$cycloalkyl, $(C_6-C_{12})$bicycloalkyl, $(C_7-C_4)$tricycloalkyl, $(C_6-C_{10})$aryl, $(C_7-C_{10})$aryl$(C_1-C_3)$alkyl, $(C_1-C_{12})$alkoxy, $(C_3-C_{12})$cycloalkoxy, $(C_6-C_{12})$bicycloalkoxy, $(C_7-C_{14})$tricycloalkoxy, $(C_6-C_{10})$aryloxy$(C_1-C_3)$alkyl or $(C_6-C_{10})$aryloxy; and $R_{14}$, $R_{15}$ and $R_{16}$ are each independently of one another methyl, ethyl, linear or branched $(C_3-C_9)$alkyl, substituted or unsubstituted $(C_6-C_{14})$aryl, methoxy ethoxy, linear or branched $(C_3-C_9)$alkoxy or substituted or unsubstituted $(C_6-C_{14})$aryloxy.

In this aspect of the invention, it has now been found that monomers of formula (III) provides further advantages. Namely, the monomers of formula (III) depending upon the nature of the monomer may impart high or low refractive index to the composition, thus it can be tailored to meet the need. In addition, the monomers of formula (III) generally improve the adhesion properties and thus can be used as "adhesion modifiers." Finally, the monomers of formula (III) may exhibit low viscosity and good solubility for the procatalyst and/or activator, among various other advantages.

The monomer of formula (IV) is:

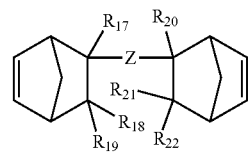

(IV)

wherein:
Z is selected from the group consisting of substituted or unsubstituted $(C_1-C_{12})$alkylene, $-(CH_2)_dO(CH_2)_e-$, $-(CH_2)_d(SiR_{26}R_{27})(OSiR_{28}R_{29})_f(CH_2)_e-$ where d, e and f are independently integers from 0 to 6, inclusive, $R_{26}$, $R_{27}$, $R_{28}$ and $R_{29}$ are the same or different and independently of each other selected from methyl, ethyl, linear or branched $(C_3-C_{12})$alkyl and an arylene selected from the following:

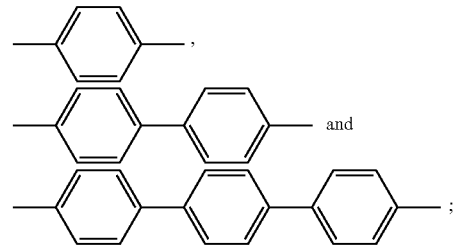

$R_{17}$, $R_{18}$, $R_{19}$, $R_{20}$, $R_{21}$ and $R_{22}$ are the same or different and independently of each other selected from hydrogen, halogen and hydrocarbyl, where hydrocarbyl is selected from methyl, ethyl, linear or branched $(C_3-C_{12})$alkyl, $(C_3-C_{12})$cycloalkyl, $(C_6-C_{12})$bicycloalkyl, $(C_7-C_{14})$tricycloalkyl, $(C_6-C_{10})$aryl, $(C_6-C_{10})$aryl$(C_1-C_3)$alkyl, $(C_1-C_{12})$alkoxy, $(C_3-C_{12})$cycloalkoxy, $(C_6-C_{12})$bicycloalkoxy, $(C_7-C_{14})$tricycloalkoxy, $(C_6-C_{10})$aryloxy$(C_1-C_3)$alkyl or $(C_6-C_{10})$-aryloxy.

The monomers of formula (IV) are bifunctional monomers and may exhibit high refractive index especially when Z is an arylene group. Accordingly, it is contemplated that incorporation of monomers of formula (IV) into composition of this invention generally increases the refractive index of the composition and also increase crosslinkability with other molecules. Thus, by incorporation of monomers of formula (IV) into the composition of this invention it may be possible to increase compatibility with other materials depending upon the intended application thereby enhancing the properties of the composition of the invention.

In another aspect of this invention it is conceivable that the composition of this invention may contain only one monomer of formula (I) or formula (II) or formula (III) or formula (IV). That is, any one of the monomers of formulae (I) to (IV) may be sufficient to form a composition of this invention. In some other embodiments the composition of this invention encompasses any two monomers of formulae (I) to (IV) and in any desirable proportions. In some other embodiments the composition of this invention encompasses any three monomers of formulae (I) to (IV) in any combinations thereof and in any desirable proportions. All such possible permutations and combinations of monomers of formulae (I) to (IV) are part of this invention.

Accordingly, any of the monomers within the scope of monomer of formula (I) can be employed in the composition of the invention. Representative examples of monomer of formula (I) include the following without any limitations:

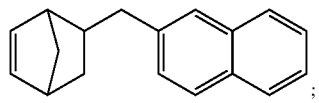

2-(bicyclo[2.2.1]hept-5-en-2-ylmethyl) naphthalene

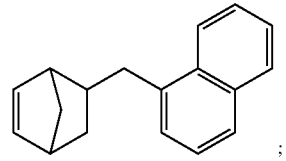

1-(bicyclo[2.2.1]hept-5-en-2-ylmethyl) naphthalene

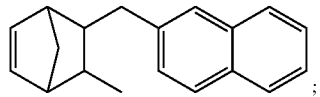

2-((3-methylbicyclo[2.2.1] hept-5-en-2-yl)methyl)naphthalene;

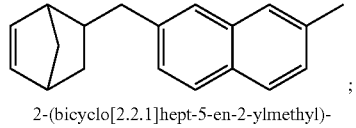

2-(bicyclo[2.2.1]hept-5-en-2-ylmethyl)- 7-methylnaphthalene

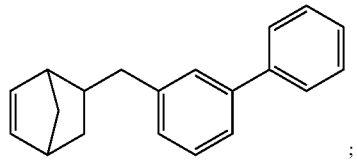

5-([1,1'-biphenyl]-3-ylmethyl) bicyclo[2.2.1]hept-2-ene

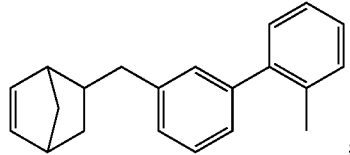

5-((2'-methyl-[1,1'-biphenyl]-3-yl)methyl) bicyclo[2.2.1]hept-2-ene;

-continued

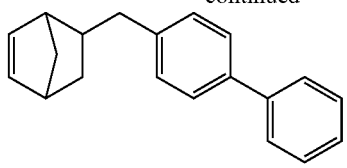

5-([1,1'biphenyl]-4-ylmethyl) bicyclo[2.2.1]hept-2-ene:

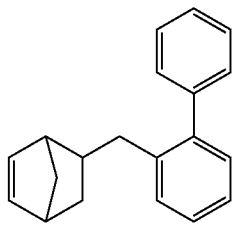

5-([1,1'-biphenyl]-2-ylmethyl) bicyclo[2.2.1]hept-2-ene

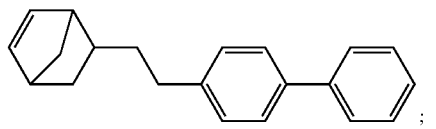

5-(2-([1,1'-biphenyl]-4-yl)ethyl)bicyclo[2.2.1] hept-2-ene (NBEtPhPh)

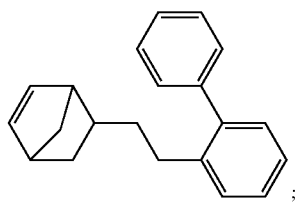

5-(2-([1,1'-biphenyl]-2-yl)ethyl) bicyclo[2.2.1]hept-2-ene

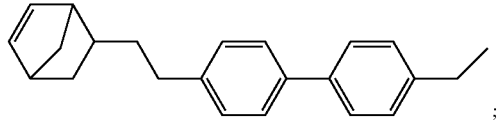

5-(2-(4'-ethyl-[1,1'-biphenyl]-4-yl) ethyl)bicyclo[2.2.1]hept-2-ene

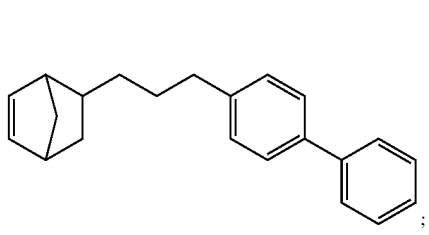

5-(3-([1,1'-biphenyl]-4-yl)propyl) bicyclo[2.2.1]hept-2-ene

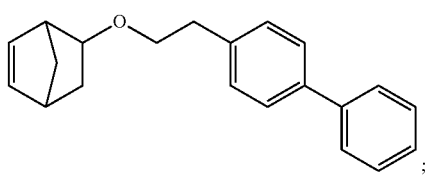

5-(2-([1,1'-biphenyl]-4-yl)ethoxy) bicyclo[2.2.1]hept-2-ene

-continued

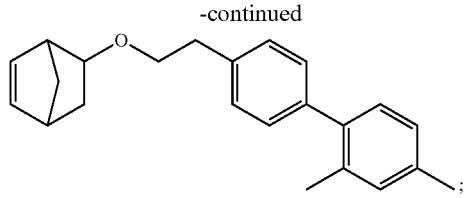

5-(2-(2',4'-dimethyl-[1,1'-biphenyl]-4-yl)ethoxy)
bicyclo[2.2.1]hept-2-ene

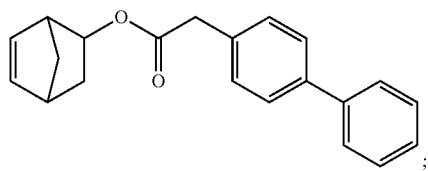

bicyclo[2.2.1]hept-5-en-2-yl
2-([1,1'-biphenyl]-4-yl)acetate

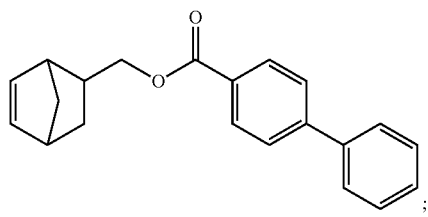

bicyclo[2.2.1]hept-5-en-2-ylmethyl
[1,1'-biphenyl]-4-carboxylate

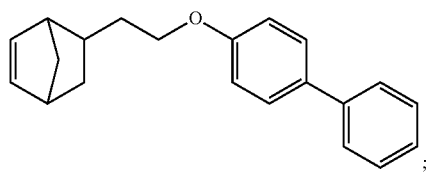

5-(2-([1,1'-biphenyl]-4-yloxy)
ethyl)bicyclo[2.2.1]hept-2-ene

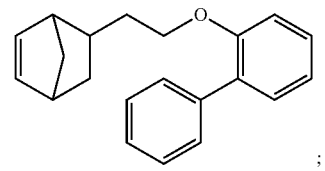

5-(2-[1,1'-biphenyl]-2-yloxy)ethyl)bicyclo
[2.2.1]hept-2-ene (NBEtOPhPh)

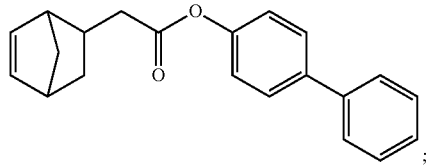

[1,1'-biphenyl]-4-yl 2-(bicyclo[2.2.1]
hept-5-en-2-yl)acetate

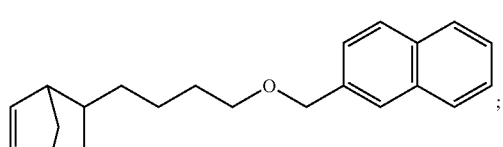

2-((4-(bicyclo[2.2.1]hept-5-en-2-yl)butoxy)methyl)naphthalene

-continued

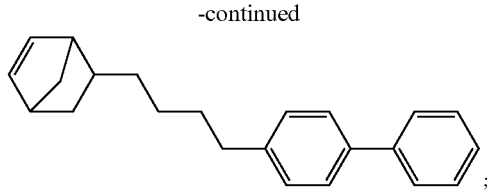

5-(4-([1,1'-biphenyl]-4-yl)butyl)bicyclo[2.2.1]hept-2-ene

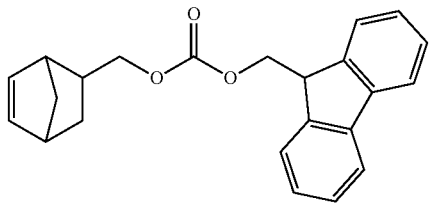

(9H-fluoren-9-yl)methyl (bicyclo[2.2.1]
hept-5-en-2-ylmethyl) carbonate

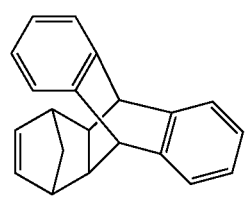

(9R,10S,11R,12S)-9,10-dihydro-
9,10-[2]bicycloanthracene

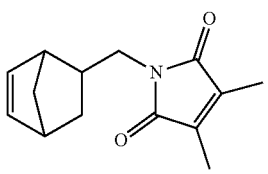

1-(4-bicyclo[2.2.1]hept-5-en-2-ylmethyl)-
3,4-dimethyl-1H-pyrrole-2,5-dione (MeDMMINB)

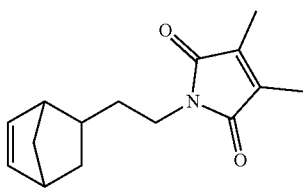

1-(4-bicyclo[2.2.1]hept-5-en-2-ylethyl)-
3,4-dimethyl-1H-pyrrole-2,5-dione (EtDMMINB)

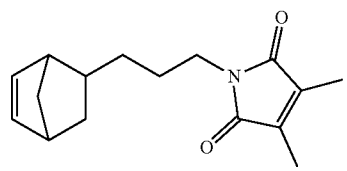

1-(4-bicyclo[2.2.1]hept-5-en-2-ylpropyl)-
3,4-dimethyl-1H-pyrrole-2,5-dione (PrDMMINB)

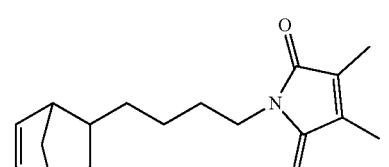

1-(4-bicyclo[2.2.1]hept-5-en-2-ylbutyl)-
3,4-dimethyl-1H-pyrrole-2,5-dione (BuDMMINB)

-continued

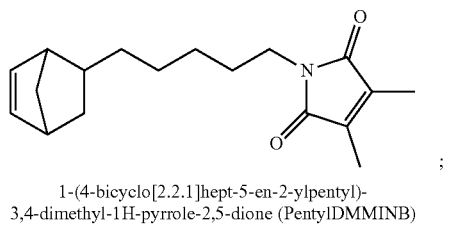

1-(4-bicyclo[2.2.1]hept-5-en-2-ylpentyl)-
3,4-dimethyl-1H-pyrrole-2,5-dione (PentylDMMINB)

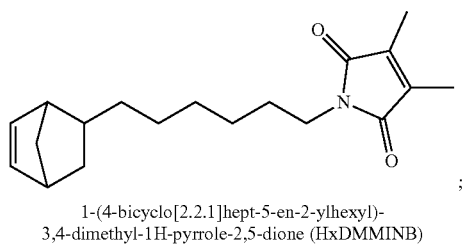

1-(4-bicyclo[2.2.1]hept-5-en-2-ylhexyl)-
3,4-dimethyl-1H-pyrrole-2,5-dione (HxDMMINB)

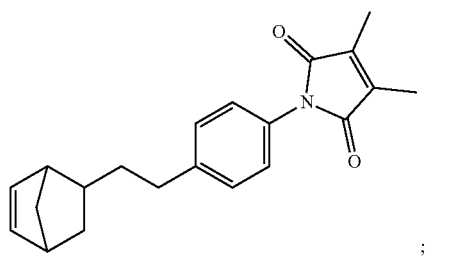

1-(4-bicyclo[2.2.1]hept-5-en-2-ylethyl)
1,4-phenylene-3,4-dimethyl-
1H-pyrrole-2,5-dione(EtPhDMMINB)

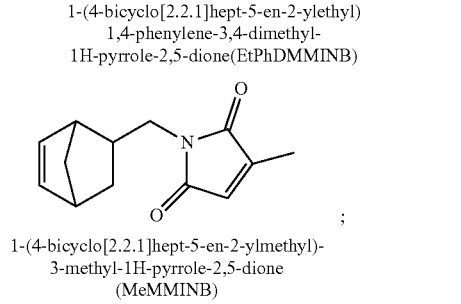

1-(4-bicyclo[2.2.1]hept-5-en-2-ylmethyl)-
3-methyl-1H-pyrrole-2,5-dione
(MeMMINB)

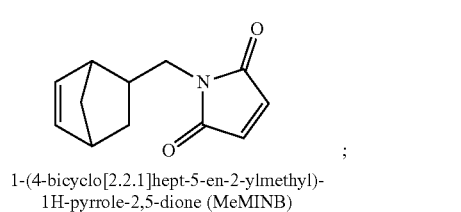

1-(4-bicyclo[2.2.1]hept-5-en-2-ylmethyl)-
1H-pyrrole-2,5-dione (MeMINB)

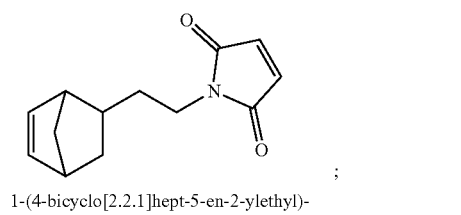

1-(4-bicyclo[2.2.1]hept-5-en-2-ylethyl)-
1H-pyrrole-2,5-dione (EtMINB)

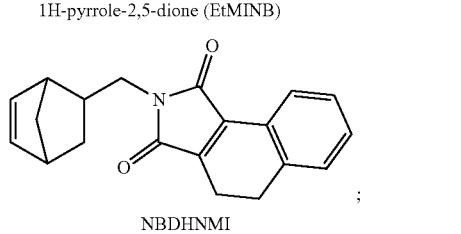

NBDHNMI

-continued

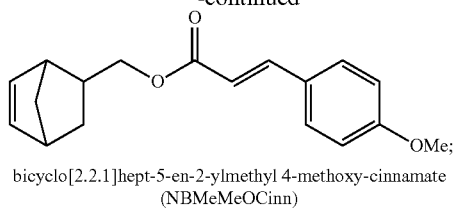

bicyclo[2.2.1]hept-5-en-2-ylmethyl 4-methoxy-cinnamate
(NBMeMeOCinn)

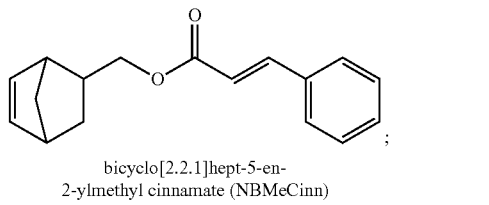

bicyclo[2.2.1]hept-5-en-
2-ylmethyl cinnamate (NBMeCinn)

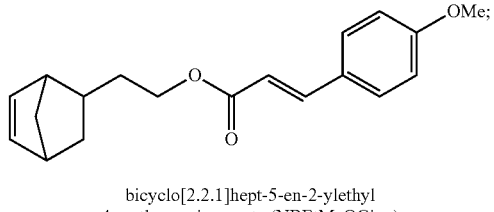

bicyclo[2.2.1]hept-5-en-2-ylethyl
4-methoxy-cinnamate (NBEtMeOCinn)

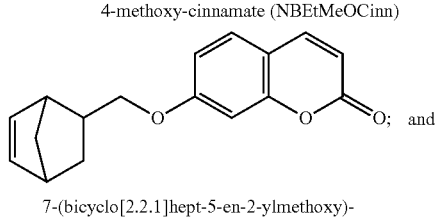

7-(bicyclo[2.2.1]hept-5-en-2-ylmethoxy)-
2H-chromen-2-one (NBMeCoum)

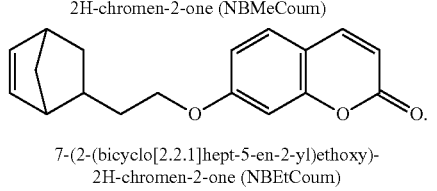

7-(2-(bicyclo[2.2.1]hept-5-en-2-yl)ethoxy)-
2H-chromen-2-one (NBEtCoum)

Turning now to specific monomers of formula (II) that can be employed to form the composition of this invention it is contemplated that any monomer of formula (II) can be employed. Exemplary monomers of such type include but not limited to those selected from the group consisting of:

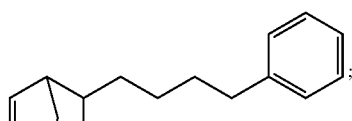

5-(4-phenylbutyl)bicyclo[2.2.1]hept-2-ene

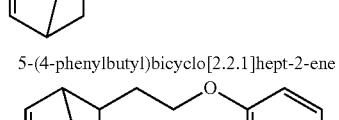

5-(2-phenoxyethyl)bicyclo[2.2.1]hept-2-ene

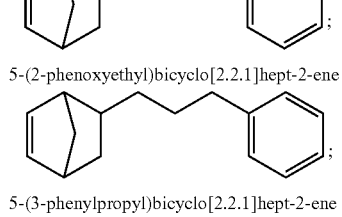

5-(3-phenylpropyl)bicyclo[2.2.1]hept-2-ene

-continued

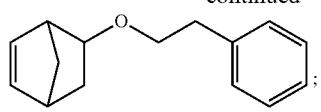
5-phenethoxybicyclo[2.2.1]hept-2-ene

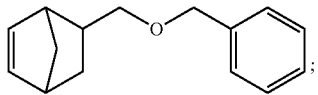
5-((benzyloxy)methyl)bicyclo[2.2.1]hept-2-ene

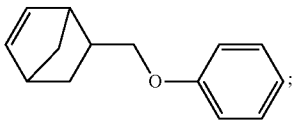
5-(phenoxymethyl)bicyclo[2.2.1]hept-2-ene

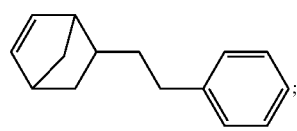
5-phenethylbicyclo[2.2.1]hept-2-ene (PENB)

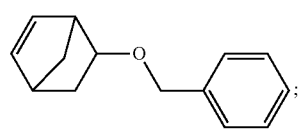
5-(benzyloxy)bicyclo[2.2.1]hept-2-ene

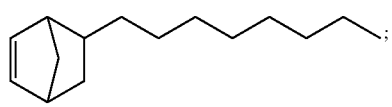
5-octylbicyclo[2.2.1]hept-2-ene (OctNB)

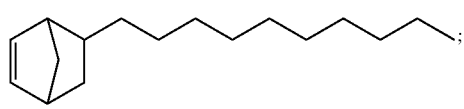
5-decylbicyclo[2.2.1]hept-2-ene (DecNB)

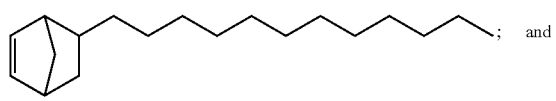
and
5-dodecylbicyclo[2.2.1]hept-2-ene (DoDecNB)

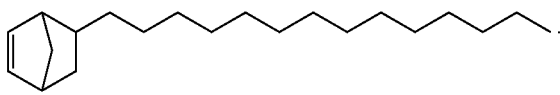
5-tetradecylbicyclo[2.2.1]hept-2-ene (TetraDecNB)

Turning now to monomer of formula (III) to form the composition of this invention it is contemplated that any monomer within the scope of monomer of formula (III) can be employed. Exemplary monomers of such type include but not limited to those selected from the group consisting of:

(bicyclo[2.2.1]hept-5-en-2-ylmethoxy)(methyl)diphenylsilane
(NBCH$_2$OSiMePh$_2$)

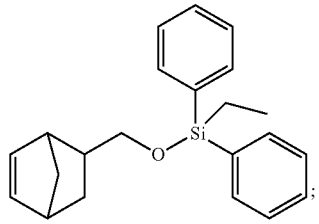
(bicyclo[2.2.1]hept-5-en-2-ylmethoxy)(ethyl)diphenylsilane

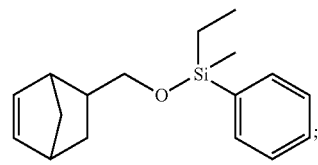
(bicyclo[2.2.1]hept-5-en-2-ylmethoxy)(ethyl)(methyl)(phenyl)silane

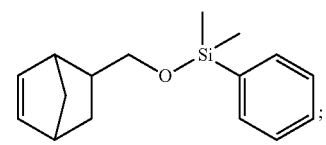
(bicyclo[2.2.1]hept-5-en-2-ylmethoxy)dimethyl(phenyl)silane

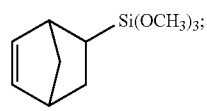
bicyclo[2.2.1]hept-5-en-2-yltrimethoxysilane

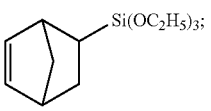
bicyclo[2.2.1]hept-5-en-2-yltriethoxysilane
(TESNB, NBSi(OC$_2$H$_5$)$_3$)

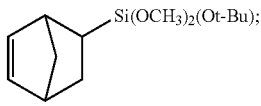
bicyclo[2.2.1]hept-5-en-2-yl(tert-butoxy)dimethoxysilane

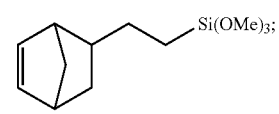
(2-(bicyclo[2.2.1]hept-5-en-2-yl)ethyl)trimethoxysilane

-continued

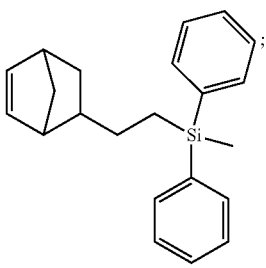

(2-(bicyclo[2.2.1]hept-5-en-2-yl)ethyl)(methyl)diphenylsilane

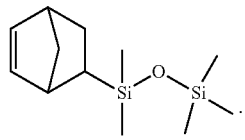

1-(bicyclo[2.2.1]hept-5-en-2-yl)-1,1,3,3,3-pentamethyldisiloxane

Turning now to monomer of formula (IV) to form the composition of this invention it is contemplated that any monomer within the scope of monomer of formula (IV) can be employed. Exemplary monomers of such type include but not limited to those selected from the group consisting of:

1,4-di(bicyclo[2.2.1]hept-5-en-2-yl)benzene

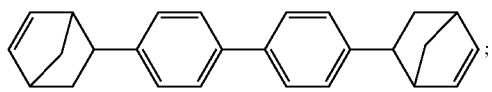

4,4′-di(bicyclo[2.2.1]hept-5-en-2-yl)-1,1′-biphenyl

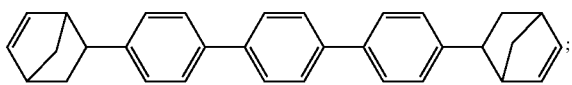

4,4″-di(bicyclo[2.2.1]hept-5-en-2-yl)-1,1′:4′,1″-terphenyl

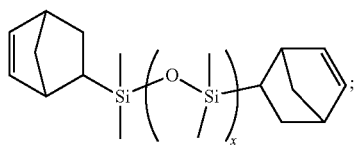

1,3-di(bicyclo[2.2.1]hept-5-en-2-yl)-1,1,3,3-tetramethyldisiloxane, when x = 1 and
1,5-di(bicyclo[2.2.1]hept-5-en-2-yl)-1,1,3,3,5,5-hexamethyltrisiloxane, when x = 2

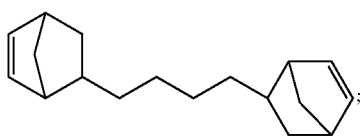

1,4-di(bicyclo[2.2.1]hept-5-en-2-yl)butane

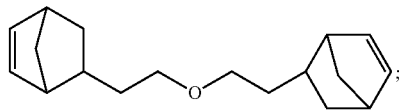

5,5′-(oxybis(ethane-2,1-diyl))bis(bicyclo[2.2.1]hept-2-ene)

-continued

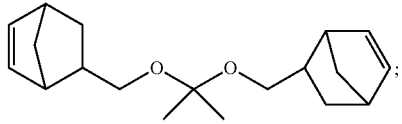

5,5′-((propane-2,2-diylbis(oxy))bis(methylene))bis(bicyclo[2.2.1]hept-2-ene)

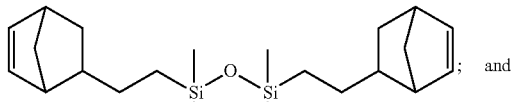

; and 1,3-bis(norbornenylethyl)-1,1,3,3-tetramethyldisiloxane (BisNBEt-Disiloxane)

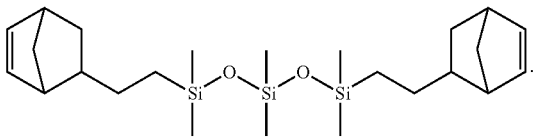

1,5-bis(norbornenylethyl)-1,1,3,3,5,5,-hexamethyltrisiloxane (BisNBEt-Trisiloxane)

In a further embodiment, the composition of this invention encompasses one or more monomers of formula (I) and at least one monomer of formula (II).

In another embodiment, the composition of this invention encompasses one or more monomers of formula (II) and at least one monomer of formula (III) and optionally one monomer of formula (I) and one monomer of formula (IV).

In yet a further embodiment, the composition of this invention encompasses one monomer of formula (I), one or more monomers of formula (II) and at least one monomer of formula (III), and optionally one monomer of formula (IV).

In yet a further embodiment, the composition of this invention encompasses one monomer of formula (III), optionally one or more monomers of formula (I), formula (II) or formula (IV).

In a further embodiment of this invention, the composition contains any of the procatalyst that would bring about the mass polymerization as described herein. Generally, such suitable procatalysts include a number of known neutral salts of transition metals, such as palladium or platinum, among others. Exemplary procatalysts without any limitation maybe selected from the group consisting of:

palladium (II) bis(tricyclohexylphosphine) dichloride;
palladium (II) bis(tricyclohexylphosphine) dibromide;
palladium (II) bis(tricyclohexylphosphine) diacetate;
palladium (II) bis(tricyclohexylphosphine) bis(trifluoroacetate);
palladium (II) bis(triisopropylphosphine) dichloride;
palladium (II) bis(triisopropylphosphine) dibromide;
palladium (II) bis(triisopropylphosphine) diacetate; and
palladium (II) bis(triisopropylphosphine) bis(trifluoroacetate).

As noted, the composition of this invention further contains a thermal or photoinitiated activator which when combined with the procatalyst will cause mass polymerization of the monomers contained therein under certain conditions as described herein. Surprisingly it has now been found that certain of the known photoactive or thermally active compounds, such as for example, photoacid generators can be used for this purpose.

In some embodiments the photoacid generator of the formula (V) is employed in the composition of this invention:

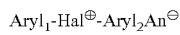  (V)

Wherein $Aryl_1$ and $Aryl_2$ are the same or different and are independently selected from the group consisting of substituted or unsubstituted phenyl, biphenyl and naphthyl; Hal is iodine or bromine; and $An^\ominus$ is a weakly coordinating anion (WCA) which is weakly coordinated to the cation complex. More specifically, the WCA anion functions as a stabilizing anion to the cation complex. The WCA anion is relatively inert in that it is non-oxidative, non-reducing, and non-nucleophilic. In general, the WCA can be selected from borates, phosphates, arsenates, antimonates, aluminates, boratobenzene anions, carborane, halocarborane anions, sulfonamidate and sulfonates Representative examples of the compounds of formula (V) may be listed as follows:

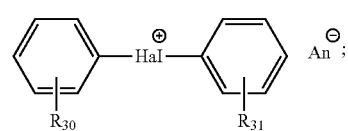 (V1)

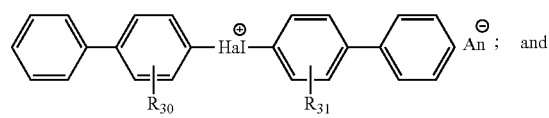 (V2) and

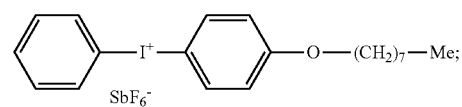 (V3)

Wherein $R_{30}$ and $R_{31}$ are the same or different and independently of each other selected from methyl, ethyl, linear or branched $(C_3-C_{12})$alkyl, $(C_3-C_{12})$cycloalkyl, $(C_6-C_{12})$bicycloalkyl, $(C_7-C_{14})$tricycloalkyl, $(C_6-C_{10})$aryl, $(C_6-C_{10})$aryl$(C_1-C_3)$alkyl, $(C_1-C_{12})$alkoxy, $(C_3-C_{12})$cycloalkoxy, $(C_6-C_{12})$bicycloalkoxy, $(C_7-C_{14})$tricycloalkoxy, $(C_6-C_{10})$aryloxy$(C_1-C_3)$alkyl and $(C_6-C_{10})$-aryloxy. It should further be noted that more than one $R_{30}$ and $R_{31}$ substituent can be present in aforementioned compounds of formula (V1), (V2) or (V3).

Non-limiting examples of suitable photoacid generators that may be employed in the composition of this invention are listed below:

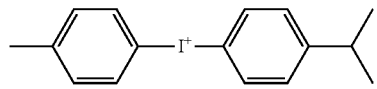

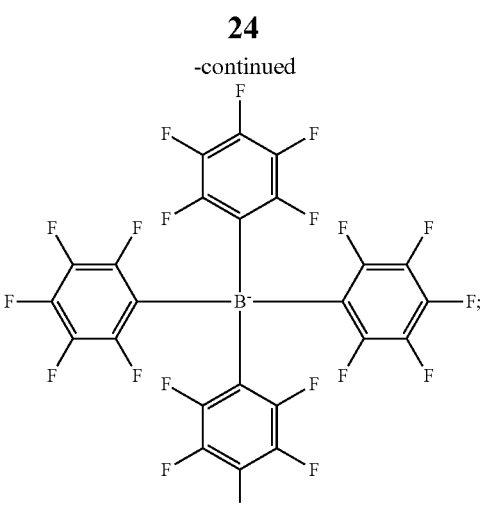

tolylcumyliodonium-tetrakis pentafluorophenylborate, commercially available under the tradename Rhodorsil 2074® from Bluestar Silicones

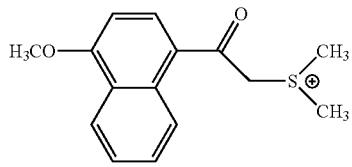

[4-(octyloxy)phenyl]-phenyliodonium (hexafluoro)antimonate (OPPI SbF$_6$)

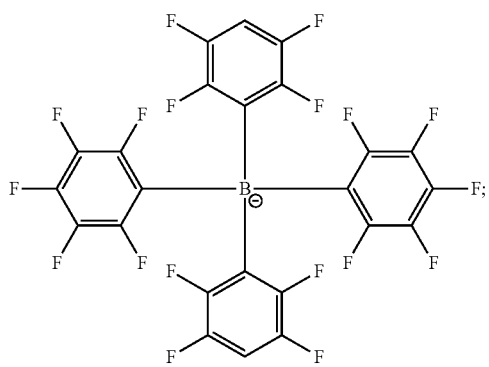

(2-(4-methoxynaphthalen-1-yl)-2-oxoethyl)dimethylsulfonium tetrakis(perfluorophenyl)borate;

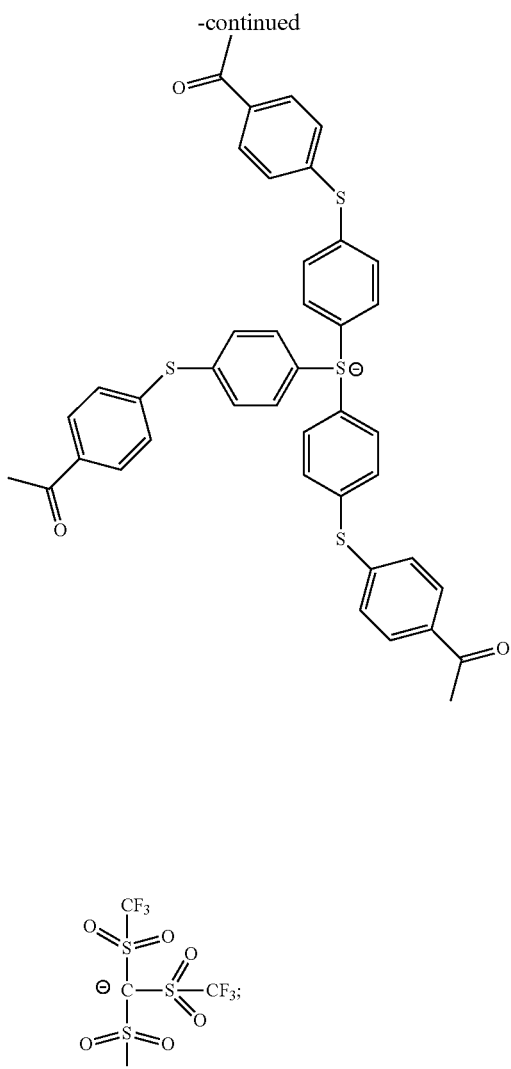

tris(4-((4-acetylphenyl)
thio)phenyl)sulfonium
tris((trifluoromethyl)sulfonyl)methanide

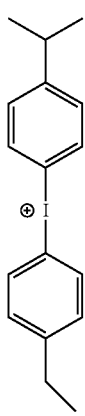

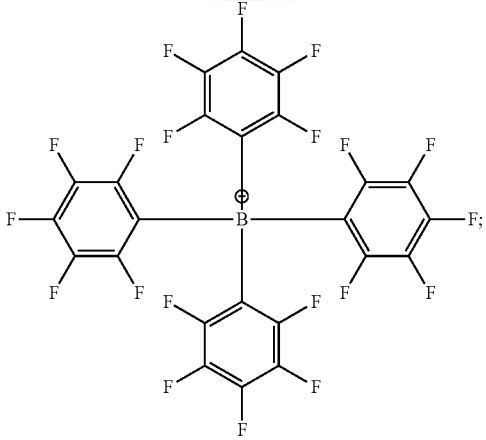

(4-ethylphenyl)(4-isopropylphenyl)iodonium
tetrakis(perfluorophenyl)borate;

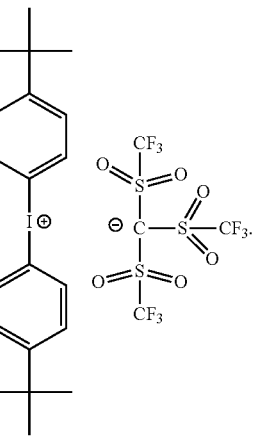

di-(p-t-butylphenyl)iodonium
tris(trifluoromethanesulfonyl)methanide

However, any of the other known photoactive or thermally active compounds which generate the activator for the procatalysts employed herein can also be used in the composition of this invention. All such compounds are part of this invention.

In some other embodiments other known activators such as the ones enumerated below may also be used as additional components in the composition of this invention: lithium tetrakis(pentafluorophenyl)borate;
lithium tetrakis(pentafluorophenyl)borate etherate;
lithium tetrakis(pentafluorophenyl)borate isopropanolate;
lithium tetrakis(3,5-bis(trifluoromethyl)phenyl)borate;
lithium tetrakis(2-fluorophenyl)borate;
lithium tetrakis(3-fluorophenyl)borate;
lithium tetrakis(4-fluorophenyl)borate;
lithium tetrakis(3,5-difluorophenyl)borate; and
dimethylanilinium tetrakis(pentafluorophenyl)borate.

As noted, surprisingly, it has now been found that employing a suitable photoactive or thermally active initiator can trigger the mass polymerization of the monomers when the composition is subjected to either an elevated temperature or to a suitable radiation. As further noted any of the photoactive or thermally active compounds that can bring about such an effect can be employed in the composition of this invention.

Accordingly, in some embodiments of this invention the composition of this invention may additionally contain a photosensitizer compound which can facilitate the formation of the activator when a photoactive activator is employed. For this purpose, any suitable sensitizer compound can be employed in the compositions of the present invention. Such suitable sensitizer compounds include, photosensitizers, such as, anthracenes, phenanthrenes, chrysenes, benzpyrenes, fluoranthenes, rubrenes, pyrenes, xanthones, indanthrenes, thioxanthen-9-ones, and mixtures thereof. In some exemplary embodiments, suitable sensitizer components include 2-isopropyl-9H-thioxanthen-9-one, 4-isopropyl-9H-thioxanthen-9-one, 1-chloro-4-propoxythioxanthone (commercially sold under the name CPTX from Lambson), phenothiazine, and mixtures thereof. Generally, photosensitizers absorb energy from the radiated light source and transfers that energy to the desirable substrate/reactant, which in the present invention is the photoactive initiator employed in the composition of this invention.

Any amount of procatalyst and the photoactive or thermally active initiator can be employed in the composition of this invention which will bring about the intended result. Generally, the molar ratio of monomer:procatalyst:photo or thermal active initiator is in the range of 10,000:1:1 to 5,000:1:1 or lower. In some other embodiments such monomer:procatalyst:photo or thermal active initiator is 15,000:1:1, 20,000:1:1 or higher.

In some embodiments of this invention the composition of this invention may additionally contain viscosity modifiers, adhesion promoters and the like. An example of adhesion promoter is a compound of formula (V):

$$G_1\text{-}A\text{-}G_2 \qquad (V)$$

wherein $G_1$ is a surface-active group, for example, a silane or a silazane group, A is a single bond or a connecting, spacer or bridging group selected from $(CZ_2)_g$, $(CH_2)_g$—$(CH=CH)_h$—$(CH_2)_g$, $(CH_2)_g$—O—$(CH_2)_g$, $(CH_2)_g$-$C_6Q_{10}$-$(CH_2)_g$, and $C(O)$, where each g is independently an integer from 1-6, h is an integer from 0 to 12, Z is independently H or F, $C_6Q_{10}$ is cyclohexyl that is substituted with Q, Q is independently H, F, $CH_3$, $CF_3$, or $OCH_3$, and $G_2$ is a crosslinkable group selected from a maleimide, a monoalkylmaleimide, a dialkylmaleimide, an epoxy, a vinyl, an acetylene, an indenyl, a cinnamate or a coumarin group, or comprises a substituted or unsubstituted maleimide portion, an epoxide portion, a vinyl portion, an acetylene portion, an indenyl portion, a cinnamate portion or a coumarin portion, and the like.

Illustrative members within the compound of formula of (V) may be enumerated as follows:

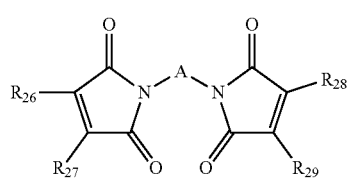

(V1)

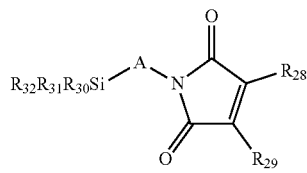

(V2)

Wherein A is as defined above. In some embodiments A is selected from methylene, ethylene, propylene, butylene, pentylene, hexylene, heptylene, octylene, nonylene, decylene, undecylene, dodecylene, octadecylene, ethyleneoxyethylene, methyleneoxybutylene, ethylene-thioethylene, ethylene-N-methyl-iminoethylene, 1-methylalkylene, ethenylene, propenylene and butenylene. $R_{26}$, $R_{27}$, $R_{28}$ and $R_{29}$ are independently of each other selected from hydrogen, $(C_1\text{-}C_6)$alkyl, and $(C_6\text{-}C_{10})$aryl. $R_{30}$, $R_{31}$ and $R_{32}$ are independently of each other selected from halogen, silazane, $(C_1\text{-}C_{12})$alkyl, optionally substituted $(C_6\text{-}C_{20})$aryl or optionally substituted $(C_2\text{-}C_{20})$heteroaryl, $(C_1\text{-}C_{12})$alkoxy, $(C_1\text{-}C_{12})$alkylamino, optionally substituted $(C_2\text{-}C_{20})$aryloxy and optionally substituted $(C_2\text{-}C_{20})$heteroaryloxy.

Non-limiting examples within the scope of compounds of formula (V2) are shown below:

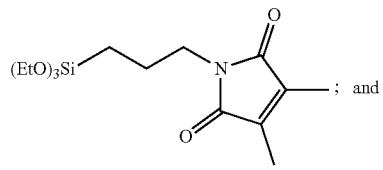

; and

1-[tri(ethoxy)silyl]-propyl-3,4-dimethyl-1H-pyrrole-2,5-dione (DMMI-Pr-TEOS)

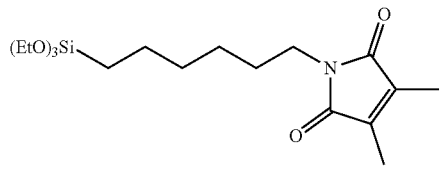

1-[tri(ethoxy)silyl]-hexyl-3,4-dimethyl-1H-pyrrole-2,5-dione (DMMI-Hex-TEOS)

Advantageously, it has further been found that the composition according to this invention forms a substantially transparent film when mass polymerized, generally, at a temperature from 50° C. to 100° C. That is to say, that when the composition of this invention is heated to certain elevated temperature, the monomers undergo mass polymerization to form films which are substantially transparent to visible light. That is, most of the visible light is transmitted through the film. In some embodiments such film formed from the composition of this invention exhibits a transmission of equal to or higher than 90 percent of the visible light. In some other embodiments such film formed from the composition of this invention exhibits a transmission of equal to or higher than 95 percent of the visible light. It should be further noted that any temperature that is suitable to carry out this mass polymerization can be employed, such as for example, 50° C. to 100° C. as indicated above. However, any temperature below 50° C. or higher than 100° C. can also be employed. In some embodiments the temperature employed to 60° C., 70° C., 80° C., 90° C. or higher than 120° C.

In some other embodiments the composition of this invention undergoes mass polymerization when exposed to suitable UV irradiation to form a substantially transparent film. In yet other embodiments the composition of this invention undergoes mass polymerization when exposed to suitable UV irradiation at a temperature from 50° C. to 100° C. to form a substantially transparent film.

In another embodiment of this invention, the composition of this invention encompasses 5-phenethylbicyclo[2.2.1]

hept-2-ene (PENB) and 5-(2-([1,1'-biphenyl]-2-yloxy)ethyl) bicyclo[2.2.1]hept-2-ene (NBEtOPhPh). This composition further contains palladium (II) bis(tricyclohexylphosphine) diacetate as procatalyst and Rhodorsil 2074 as a photo activator or thermal activator.

In another embodiment of this invention, the composition of this invention encompasses 1-(4-bicyclo[2.2.1]hept-5-en-2-ylbutyl)-3,4-dimethyl-1H-pyrrole-2,5-dione (BuDM-MINB), palladium (II) bis(tricyclohexylphosphine) diacetate as procatalyst and Rhodorsil 2074 as a photo activator or thermal activator. This composition further contains 1,3-bis(norbornenylethyl)-1,1,3,3,-tetramethyldisiloxane (BisN-BEt-Disiloxane) as a crosslinker.

In a further aspect of this invention there is provided a kit for forming a substantially transparent film. There is dispensed in this kit a composition of this invention. Accordingly, in some embodiments there is provided a kit in which there is dispensed one or more monomers of formula (I) or formula (II) and optionally one or more monomers of formula (III) and/or formula (IV) in any combination thereof so as to obtain a desirable result and/or for intended purpose. Further, said kit comprises a procatalyst and a photo or thermal activator. The monomers of formulae (I) to formulae (IV) are the ones as described hereinabove.

In some embodiments, the aforementioned kit encompasses one or more monomers of formula (I) and one or more monomers of formula (II). In some other embodiments the kit of this invention encompasses at least two monomers wherein first monomer is of formula (I) and second monomer is of formula (II). Any of the monomers of formula (I) or (II) as described herein can be used in this embodiment. The molar ratio of monomers of formula (I) and formula (II) contained in these components can vary and may range from 1:99 to 99:1, or 10:90 to 90:10, 20:80 to 80:20, 30:70 to 70:30, 60:40 to 40:60 or 50:50, and so on. In some other embodiments to the kit may encompass a composition wherein dispensed two monomers which could be one monomer of formula (I) and another monomer of formula (II). Further, the monomer of formula (I) is completely soluble in monomer of formula (II) to form a clear solution at room temperature. In some embodiments the monomer mixture may become a clear solution at slightly elevated temperature, such as for example, 30° C. or 40° C. or 50° C., before they undergo mass polymerization. In another aspect of this embodiment of this invention the composition of this invention undergoes mass polymerization at a temperature of from 50° C. to 100° C. for a sufficient length of time to form a polymeric film. That is to say that the composition of this invention is poured onto a surface or onto a substrate which needs to be encapsulated, and heated to a temperature of 50° C. to 100° C. in order for the monomers to undergo polymerization to form a solid transparent polymer which could be in the form of a transparent film. Generally, as already noted above, such polymerization can take place at 50° C., 60° C., 70° C., 80° C., 90° C., 100° C. or higher. The heating can also be carried out in stages to trigger the polymerization, for example to 60° C. for 5 minutes, and then heating to 70° C. for 15 minutes and so on. By practice of this invention it is now possible to obtain polymeric films on such substrates which are substantially transparent film. The "substantially transparent film" as used herein means that the films formed form the composition of this invention are optically clear in the visible light. Accordingly, in some embodiments of this invention such films are having at least 90 percent of visible light transmission, in some other embodiments the films formed from the composition of this invention exhibit at least 95 percent of visible light transmission.

In some embodiments of this invention the kit as described herein encompasses a composition which further contains one or more monomers selected from monomer of formula (III) or monomer of formula (IV) as described hereinabove. Again, any of the monomers of formula (III) or (IV) as described herein can be used in this embodiment, and in any desirable amounts depending on the nature of the intended use.

In some embodiments, the kit as described herein encompasses a composition, which contains 5-(2-([1,1'-biphenyl]-2-yloxy)ethyl)bicyclo[2.2.1]hept-2-ene (NBEtOPhPh), 5-phenethylbicyclo[2.2.1]hept-2-ene (PENB) palladium (II) bis(tricyclohexyl-phosphine) diacetate and Rhodorsil 2074.

In some other embodiments, the kit as described herein encompasses a composition, which contains 5-(2-([1,1'-biphenyl]-2-yloxy)ethyl)bicyclo[2.2.1]hept-2-ene (NBEtOPhPh), 5-phenethylbicyclo[2.2.1]hept-2-ene (PENB) and (bicyclo[2.2.1]hept-5-en-2-ylmethoxy)(methyl)diphenylsilane (NBCH$_2$OSiMePh$_2$); palladium (II) bis(tricyclohexylphosphine) diacetate and Rhodorsil 2074.

In another aspect of this invention there is further provided a composition comprising one or more monomers of formula (I) or formula (II), a procatalyst, a thermal or photoactivator and optionally an activator. Any of the monomers of formula (I) or formula (II) as described hereinabove can be used in this aspect of the invention. The monomer of formula (I) is having a refractive index of at least 1.5. The monomer of formula (II) is having a refractive index less than 1.6 and viscosity below 100 centipoise. The monomer of formula (I) is completely miscible with said second monomer of formula (II) and forms a clear solution. When the composition is heated to a temperature in the range of from 50° C. to 100° C. and optionally exposed to suitable irradiation forms a substantially transparent film having a transmission higher than 90 percent of the visible light.

In yet another aspect of this invention there is further provided a method of forming a substantially transparent film for the fabrication of a variety of optoelectronic device comprising:

forming a homogeneous clear composition comprising one or more monomers of formula (I) or formula (II), a procatalyst and a thermal or photoactivator;

coating a suitable substrate with the composition or pouring the composition onto a suitable substrate to form a film; and heating the film to a suitable temperature to cause polymerization of the monomers.

The coating of the desired substrate to form a film with the composition of this invention can be performed by any of the coating procedures as described herein and/or known to one skilled in the art, such as by spin coating. Other suitable coating methods include without any limitation spraying, doctor blading, meniscus coating, ink jet coating and slot coating. The mixture can also be poured onto a substrate to form a film. Suitable substrate includes any appropriate substrate as is, or may be used for electrical, electronic or optoelectronic devices, for example, a semiconductor substrate, a ceramic substrate, a glass substrate.

Next, the coated substrate is baked, i.e., heated to facilitate the mass polymerization, for example to a temperature from 50° C. to 100° C. for about 1 to 60 minutes, although other appropriate temperatures and times can be used. In some embodiments the substrate is baked at a temperature of from about 60° C. to about 90° C. for 2 minutes to 10 minutes. In some other embodiments the substrate is baked at a temperature of from about 60° C. to about 90° C. for 5 minutes to 20 minutes.

The films thus formed are then evaluated for their optical properties using any of the methods known in the art. For example, the refractive index of the film across the visible spectrum can be measured by ellipsometry. The optical quality of the film can be determined by visual observation. Quantitatively the percent transparency can be measured by visible spectroscopy. Generally, the films formed according to this invention exhibit excellent optical transparent properties and can be tailored to desirable refractive index as described herein.

Accordingly, in some of the embodiments of this invention there is also provided a optically transparent film obtained by the mass polymerization of the composition as described herein. In another embodiment there is also provided an optoelectronic device comprising the transparent film of this invention as described herein.

The following examples are detailed descriptions of methods of preparation and use of certain compounds/monomers, polymers and compositions of the present invention. The detailed preparations fall within the scope of, and serve to exemplify, the more generally described methods of preparation set forth above. The examples are presented for illustrative purposes only, and are not intended as a restriction on the scope of the invention. As used in the examples and throughout the specification the ratio of monomer to catalyst is based on a mole to mole basis.

EXAMPLES

The following abbreviations have been used hereinbefore and hereafter in describing some of the compounds, instruments and/or methods employed to illustrate certain of the embodiments of this invention:
NBEtOPhPh—5-(2-([1,1'-biphenyl]-2-yloxy)ethyl)bicyclo[2.2.1]hept-2-ene; PENB—5-phenethylbicyclo[2.2.1]hept-2-ene; BuDMMINB—1-(4-bicyclo[2.2.1]hept-5-en-2-ylbutyl)-3,4-dimethyl-1H-pyrrole-2,5-dione; Rhodorsil 2074—tolylcumyliodonium-tetrakis pentafluorophenylborate; LiFABA—lithium tetrakis(pentafluorophenyl)borate etherate; Pd785—palladium bis(tricyclohexylphosphine)diacetate; Irgacure 290—tris(4-(4-acetylphenylthio)phenyl)sulfonium tetrakis(pentafluorophenyl)borate; BisNB-Disiloxane—1,3-bis(norbomenylethyl)-1,1,3,3,-tetramethyldisiloxane; BisNB-Trisiloxane—1,5-bis(norbornenylethyl)-1,1,3,3,5,5,-hexamethyltrisiloxane; DMMI-Pr-TEOS—1-[tri(ethoxy)silyl]-propyl-3,4-dimethyl-1H-pyrrole-2,5-dione; DMMI-Hex-TEOS—1-[tri(ethoxy)silyl]-hexyl-3,4-dimethyl-1H-pyrrole-2,5-dione; OPPI PAG—([4-(octyloxy)phenyl]phenyliodonium (hexafluoro)antimony; CPTX—1-chloro-4-propoxythioxanthone; GPC—gel permeation chromatography; $M_w$—weight average molecular weight; PDI—polydispersity index; cP—centipoise.

Various monomers as used herein are either commercially available or can be readily prepared following the procedures as described in the co-pending U.S. patent application Ser. No. 15/253,980, filed Sep. 1, 2016.

The following Examples 1-3 demonstrate that the compositions of this invention are quite stable at 35° C. for up to seven days and can very readily be mass polymerized by heating to a temperature of 100° C.

Example 1

Mass Polymerization of NBEtOPhPh/PENB (10/90 Molar Ratio)

In a glass bottle, NBEtOPhPh (0.88 g, 3 mmol), PENB (5.34 g, 27 mmol), Pd785 (2.4 mg, 3 µmol) and Rhodorsil 2074 (3 mg, 3 µmol) were mixed together to form a clear solution. The bottle was then allowed to roll for 30 minutes. The viscosity of the solution was 6 cP as measured by a Brookfield DV-I Prime viscometer. The composition was then stored in the dark at 35° C. for seven days. The viscosity after storage was 5 cP. The stored composition was then heated to 100° C. for one hour, resulting in a hard solid polymeric material.

Example 2

Mass Polymerization of PENB

The procedure of Example 1 was substantially repeated in Example 2, except for employing the following amounts of ingredients: PENB (108.9 g, 0.55 mol), Pd785 (43 mg, 55 µmol) and Rhodorsil 2074 (56 mg, 55 mol) dissolved in 5.5 g of dichloromethane. The viscosity of the solution was 4.7 cP as measured by a Brookfield DV-I Prime viscometer. The composition was then stored in the dark at 35° C. for seven days. The viscosity after storage was 4.7 cP. The stored composition was then heated to 100° C. for one hour, resulting in a hard solid polymeric material.

Example 3

Mass Polymerization of NBEtOPhPh/PENB (50/50 Molar Ratio)

The procedure of Example 1 was substantially repeated in Example 3, except for employing the following amounts of ingredients: NBEtOPhPh (3.65 g, 12.5. mmol), PENB (2.49 g, 12.6 mmol), Pd785 (2 mg, 2.5 µmol) and Rhodorsil 2074 (2.5 mg, 2.5 µmol). The viscosity of the solution was 21 cP as measured by a Brookfield DV-I Prime viscometer. The composition was then stored in the dark at 35° C. for seven days. The viscosity after storage was 21 cP. The stored composition was then heated to 100° C. for one hour, resulting in a hard solid polymeric material.

Example 4

Mass Polymerization of NBEtOPhPh/PENB (10/90 Molar Ratio) with CPTX

In a glass bottle, NBEtOPhPh (0.29 g, 1.0 mmol), PENB (1.78 g, 9.0 mmol), Pd785 (0.79 mg, 1 µmol), Rhodorsil 2074 (2 mg, 2.3 µmol) and CPTX (0.3 mg, 1 µmol) were mixed together to form a clear solution. The bottle was then allowed to roll for 30 minutes. The composition was then exposed to 3 J/cm$^2$ of ultraviolet radiation using an ELC-4001 UV Light System equipped with a UV-A lamp, resulting in gelation. The composition was subsequently heated to 100° C. for one hour, resulting in a hard solid polymeric material.

Example 5

Mass Polymerization of BuDMMINB

In a glass bottle, BuDMMINB (30.76 g, 113 mmol), Pd785 (17.7 mg, 22.5 µmol) and Rhodorsil 2074 (51.5 mg, 50.6 µmol) were mixed together to form a clear solution. The bottle was then allowed to roll for 30 minutes. The viscosity of the solution was 122 cP as measured by a Brookfield DV-I Prime viscometer. 1.0 g of the composition was then exposed to 3 J/cm² of ultraviolet radiation using an ELC-4001 UV Light System equipped with a UV-A lamp and subsequently heated to 100° C. for one hour, resulting in a hard solid polymeric material. The remaining material was then stored in the dark at 35° C. for five days. The viscosity after storage was 128 cP.

Example 6

Mass Polymerization of BuDMMINB with Crosslinker

In a glass bottle, BuDMMINB (1.23 g, 4.5 mmol), Bis-NBEt-Disiloxane (0.19 g, 0.5 mmol), Pd785 (0.79 mg, 1.0 mop, Rhodorsil 2074 (2.3 mg, 2.3 µmol) were mixed together to form a clear solution. The bottle was then allowed to roll for 30 minutes. The composition was then exposed to 3 J/cm² of ultraviolet radiation using an ELC-4001 UV Light System equipped with a UV-A lamp and subsequently heated to 100° C. for one hour, resulting in a hard solid polymeric material.

Example 7

Mass Polymerization of BuDMMINB with Adhesion Promoter

In a glass bottle, BuDMMINB (1.73 g, 6.3 mmol), DMMI-Hex-TEOS (0.26 g, 0.7 mmol), Pd785 (1.1 mg, 1.4 µmol), Rhodorsil 2074 (3.2 mg, 3.2 µmol) were mixed together to form a clear solution. The bottle was then allowed to roll for 30 minutes. The composition was then exposed to 3 J/cm² of ultraviolet radiation using an ELC-4001 UV Light System equipped with a UV-A lamp and subsequently heated to 100° C. for one hour, resulting in a hard solid polymeric material.

Example 8

Mass Polymerization of NBEtOPhPh/PENB (10/90 Molar Ratio) with CPTX and Viscosity Modifier In a glass bottle, NBEtOPhPh (4.1 g, 14 mmol), PENB (25.0 g, 126 mmol), Pd785 (11 mg, 14 µmol), Rhodorsil 2074 (32 mg, 32 µmol), CPTX (4.3 mg, 14 µmol) and 4.7 g of 35,000 to $M_w$ polystyrene (Aldrich) were rolled overnight to form a clear solution with a viscosity of 98 cP. The composition was then exposed to 3 J/cm² of ultraviolet radiation using an ELC-4001 UV Light System equipped with a UV-A lamp, resulting in gelation. The composition was subsequently heated to 100° C. for one hour, resulting in a hard, solid, transparent polymeric material.

Example 9

Mass Polymerization of NBEtOPhPh/PENB (10/90 Molar Ratio) with OPPI-SbF₆ as PAG

In a glass bottle, NBEtOPhPh (0.22 g, 0.75 mmol), PENB (1.37 g, 6.75 mmol), Pd785 (0.59 mg, 0.75 µmol), OPPI-SbF$_6$ (1.1 mg, 1.7 µmol) and CPTX (0.23 mg, 0.75 µmol) were mixed together to form a clear solution. The bottle was then allowed to roll for 30 minutes. The composition was then exposed to 3 J/cm² of ultraviolet radiation using an ELC-4001 UV Light System equipped with a UV-A lamp, resulting in gelation. The composition was subsequently heated to 100° C. for one hour, resulting in a hard solid polymeric material.

The following Comparative Examples 1 to 3 illustrate that any deviation from the practice of this invention will result in mass polymerization of the monomers of this invention at 35° C. or no mass polymerization taking place as evidenced in Comparative Example 4.

Comparative Example 1

In a glass bottle, NBEtOPhPh (0.73 g, 2.5 mmol), PENB (4.47 g, 22.6 mmol), Pd785 (2 mg, 2.5 µmol) and LiFABA (2.2 mg, 2.5 µmol) were mixed together to form a clear solution. The bottle was then allowed to roll for 30 minutes. The viscosity of the solution was 5 cP as measured by a Brookfield DV-I Prime viscometer. The composition was then stored in the dark at 35° C., gelation occurred within 48 hours.

Comparative Example 2

In a glass bottle, PENB (4.95 g, 25 mmol), Pd785 (2 mg, 2.5 µmol) and LiFABA (2.2 mg, 2.5 µmol) dissolved in 0.22 g of dichloroethane were mixed together to form a clear solution. The bottle was then allowed to roll for 30 minutes. The viscosity of the solution was 5 cP as measured by a Brookfield DV-I Prime viscometer. The composition was then stored in the dark at 35° C., gelation occurred within 18 hours.

Comparative Example 3

In a glass bottle, NBEtOPhPh (3.65 g, 12.5 mmol), PENB (2.48 g, 12.5 mmol), Pd785 (2 mg, 2.5 µmol) and LiFABA (2.2 mg, 2.5 µmol) were mixed together to form a clear solution. The bottle was then allowed to roll for 30 minutes. The viscosity of the solution was 20 cP as measured by a Brookfield DV-I Prime viscometer. The composition was then stored in the dark at 35° C., gelation occurred within 168 hours.

Comparative Example 4

In a glass bottle, NBEtOPhPh (0.65 g, 2.2. mmol), PENB (0.45 g, 2.3 mmol), Pd785 (0.36 mg, 0.45 µmol) and Irgacure 290 (0.63 mg, 0.45 µmol) dissolved in 62 mg dichloroethane were mixed together to form a clear solution. The bottle was then allowed to roll for 30 minutes. The viscosity of the solution was 12 cP as measured by a Brookfield DV-I Prime viscometer. The composition was then heated to 100° C. for one hour. No change in viscosity was observed indicating that the monomers were not mass polymerized under these conditions.

Although the invention has been illustrated by certain of the preceding examples, it is not to be construed as being limited thereby; but rather, the invention encompasses the generic area as hereinbefore disclosed. Various modifications and embodiments can be made without departing from the spirit and scope thereof.

What is claimed is:

1. A composition comprising one or more monomers of formula (I) or formula (II) and wherein said composition further comprises a procatalyst and a thermal or photoactivator, wherein:

a) said monomer of formula (I) is:

(I)

wherein:
m is an integer 0, 1 or 2;
at least one of $R_1$, $R_2$, $R_3$ and $R_4$ is selected from the group consisting of:
a group of formula (A):

—X-Aryl    (A);

a group of formula (A1):

(A1)

—(CH$_2$)$_k$—N with $R_{23}$, $R_{24}$;

a group of formula (A2):

(A2)

—(CH$_2$)$_k$-Arylene-N with $R_{23}$, $R_{24}$;

a group of formula (A3):

(A3)

—(CH$_2$)$_k$—O—C(O)—CH=CH—phenyl-$R_{25}$;

and
a group of formula (A4):

(A4)

—(CH$_2$)$_k$—O—coumarin;

wherein:
X is selected from the group consisting of:
O, CO, C(O)O, OC(O), OC(O)O, S, $(CR_5R_6)_a$, $O(CR_5R_6)_a$, $(CR_5R_6)_aO$, $C(O)(CR_5R_6)_a$, $(CR_5R_6)_aC(O)$, $C(O)O(CR_5R_6)_a$, $(CR_5R_6)_aC(O)O$, $OC(O)(CR_5R_6)_a$, $(CR_5R_6)_aOC(O)$, $(CR_5R_6)_aOC(O)O$, $(CR_5R_6)_aOC(O)O(CR_5R_6)_a$, $OC(O)O(CR_5R_6)_a$, $S(CR_5R_6)_a$, $(CR_5R_6)_aS$, $(SiR_5R_6)_a$, $O(SiR_5R_6)_a$, $(SiR_5R_6)_aO$, where $R_5$ and $R_6$ are the same or different and each independently selected from hydrogen, methyl, ethyl, linear or branched $(C_3-C_{12})$alkyl and substituted or unsubstituted $(C_6-C_{14})$aryl, and a is an integer from 0 to 12, inclusive;
Aryl is substituted or unsubstituted biphenyl, substituted or unsubstituted naphthyl substituted or unsubstituted terphenyl, substituted or unsubstituted anthracenyl substituted or unsubstituted fluorenyl;
k is an integer from 1 to 12;
$R_{23}$, $R_{24}$ and $R_{25}$ are the same or different and each independently selected from the group consisting of hydrogen, methyl, ethyl, linear or branched $(C_3-C_{12})$alkyl, perfluoro$(C_1-C_{12})$alkyl, methoxy, ethoxy, linear or branched $(C_3-C_{12})$alkoxy, $(C_3-C_{12})$cycloalkyl, $(C_6-C_{12})$bicycloalkyl, $(C_7-C_{14})$tricycloalkyl, $(C_6-C_{10})$aryl, $(C_6-C_{10})$aryl$(C_1-C_6)$alkyl, perfluoro$(C_6-C_{10})$aryl and perfluoro$(C_6-C_{10})$aryl$(C_1-C_3)$alkyl; or
$R_{23}$ and $R_{24}$ taken together with the intervening carbon atoms to which they are attached to form a substituted or unsubstituted $(C_5-C_{14})$cyclic, $(C_5-C_{14})$bicyclic or $(C_5-C_{14})$tricyclic ring; and Arylene is substituted or unsubstituted bivalent $(C_6-C_{14})$aryl;
the remaining $R_1$, $R_2$, $R_3$ and $R_4$ are the same or different and each independently selected from the group consisting of hydrogen, halogen, a hydrocarbyl or halohydrocarbyl group selected from methyl, ethyl, linear or branched $(C_3-C_{12})$alkyl, perfluoro$(C_1-C_{12})$alkyl, $(C_3-C_{12})$cycloalkyl, $(C_6-C_{12})$bicycloalkyl, $(C_7-C_{14})$tricycloalkyl, $(C_6-C_{10})$aryl, $(C_6-C_{10})$aryl$(C_1-C_6)$alkyl, perfluoro$(C_6-C_{10})$aryl and perfluoro$(C_6-C_{10})$aryl$(C_1-C_3)$alkyl; or
one of $R_1$ and $R_2$ taken together with one of $R_3$ and $R_4$ and the carbon atoms to which they are attached to form a substituted or unsubstituted $(C_5-C_{14})$cyclic, $(C_5-C_{14})$bicyclic or $(C_5-C_{14})$tricyclic ring;
b) said monomer of formula (II) is:

(II)

wherein:
n is an integer 0, 1 or 2;
$R_7$, $R_8$, $R_9$ and $R_{10}$ are the same or different and each independently selected from the group consisting of hydrogen, halogen, a hydrocarbyl or halohydrocarbyl group selected from methyl, ethyl, linear or branched $(C_3-C_{16})$alkyl, perfluoro$(C_1-C_{12})$alkyl, $(C_3-C_{12})$cycloalkyl, $(C_6-C_{12})$bicycloalkyl, $(C_7-C_{14})$tricycloalkyl, $(C_6-C_{10})$aryl, $(C_6-C_{10})$aryl$(C_1-C_6)$alkyl, perfluoro$(C_6-C_{10})$aryl, perfluoro$(C_6-C_{10})$aryl$(C_1-C_3)$alkyl and a group of formula (B):

—Y-Aryl$_1$    (B)

wherein:
Y is selected from the group consisting of:
$(CR_5R_6)_a$, $O(CR_5R_6)_a$ and $(CR_5R_6)_aO$, where a, $R_5$ and $R_6$ are as defined above;
Aryl$_1$ is phenyl or phenyl substituted with one or more $(C_1-C_6)$alkyl;

wherein
said monomer of formula (I) is having a refractive index of at least 1.5 and said composition is in a clear liquid form at room temperature; and wherein said thermal or photoactivator is of the formula (V):

Aryl-Hal$^{\oplus\text{-}Aryl}{}_2$ An$\ominus$ (V)

wherein Aryl$_1$ and Aryl$_2$ are the same or different and are independently selected from the group consisting of phenyl and substituted phenyl with one or more (C$_1$-C$_6$)alkyl;
Hal is iodine or bromine; and
An$\ominus$ is a weakly coordinating anion.

2. The composition according to claim 1, wherein said composition comprises at least two monomers wherein first monomer is of formula (I) and second monomer is of formula (II) and is having a refractive index less than 1.6 and viscosity below 100 centipoise, and wherein said first monomer is completely miscible with said second monomer to form a clear solution.

3. The composition according to claim 1, wherein said compositions contains said monomer of formula (I) and said monomer of formula (II) in a molar ratio of from 0:100 to 100:0.

4. The composition according to claim 1, wherein said compositions contains said monomer of formula (I) and said monomer of formula (II) in a molar ratio of from 5:95 to 95:5.

5. The composition according to claim 1, wherein said composition forms a substantially transparent film when heated to a temperature from 50° C. to 100° C.

6. The composition according to claim 5, wherein said film has a transmission of equal to or higher than 90 percent of the visible light.

7. The composition according to claim 5, wherein said film has a transmission of equal to or higher than 95 percent of the visible light.

8. The composition according to claim 1 further comprising one or more monomers selected from monomer of formula (III) or monomer of formula (IV), wherein said monomer of formula (III) is:

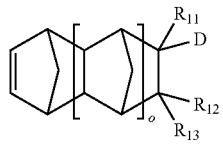
(III)

wherein:
o is an integer from 0 to 2, inclusive;
D is SiR$_{14}$R$_{15}$R$_{16}$ or a group selected from:

—(CH$_2$)$_c$—O—SiR$_{14}$R$_{15}$R$_{16}$ (E);

—(CH$_2$)$_c$—SiR$_{14}$R$_{15}$R$_{16}$ (F); and

—(SiR$_{14}$R$_{15}$)$_c$—O—SiR$_{14}$R$_{15}$R$_{16}$ (G); wherein c is an integer from 1 to 10, inclusive, and where one or more of CH$_2$ is optionally substituted with (C$_1$-C$_{10}$) alkyl or (C$_1$-C$_{10}$)perfluoroalkyl;

R$_{11}$, R$_{12}$ and R$_{13}$ are the same or different and independently of each other selected from hydrogen, halogen and hydrocarbyl, where hydrocarbyl is selected from methyl, ethyl, linear or branched (C$_3$-C$_{12}$)alkyl, (C$_3$-C$_{12}$)cycloalkyl, (C$_6$-C$_{12}$)bicycloalkyl, (C$_7$-C$_{14}$)tricycloalkyl, (C$_6$-C$_{10}$)aryl, (C$_6$-C$_{10}$)aryl(C$_1$-C$_3$)alkyl, (C$_1$-C$_{12}$)alkoxy, (C$_3$-C$_{12}$)cycloalkoxy, (C$_6$-C$_{12}$)bicycloalkoxy, (C$_7$-C$_{14}$)tricycloalkoxy, (C$_6$-C$_{10}$)aryloxy(C$_1$-C$_3$)alkyl or (C$_6$-C$_{10}$)aryloxy; and R$_{14}$, R$_{15}$ and R$_{16}$ are each independently of one another methyl, ethyl, linear or branched (C$_3$-C$_9$)alkyl, substituted or unsubstituted (C$_6$-C$_{14}$)aryl, methoxy ethoxy, linear or branched (C$_3$-C$_9$)alkoxy or substituted or unsubstituted (C$_6$-C$_{14}$)aryloxy;

said monomer of formula (IV) is:

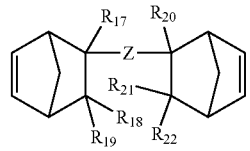
(IV)

wherein:
Z is selected from the group consisting of substituted or unsubstituted (C$_1$-C$_{12}$)alkylene, —(CH$_2$)$_d$O(CH$_2$)$_e$—, —(CH$_2$)$_d$(SiR$_{26}$R$_{27}$)(OSiR$_{28}$R$_{29}$)$_f$(CH$_2$)$_e$— where d, e and f are independently integers from 0 to 6, inclusive, R$_{26}$, R$_{27}$, R$_{28}$ and R$_{29}$ are the same or different and independently of each other selected from methyl, ethyl, linear or branched (C$_3$-C$_{12}$)alkyl, and an arylene selected from the following:

,

 and

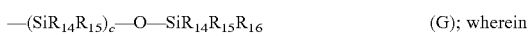;

R$_{17}$, R$_{18}$, R$_{19}$, R$_{20}$, R$_{21}$ and R$_{22}$ are the same or different and independently of each other selected from hydrogen, halogen and hydrocarbyl, where hydrocarbyl is selected from methyl, ethyl, linear or branched (C$_3$-C$_{12}$)alkyl, (C$_3$-C$_{12}$)cycloalkyl, (C$_6$-C$_{12}$)bicycloalkyl, (C$_7$-C$_{14}$)tricycloalkyl, (C$_6$-C$_{10}$)aryl, (C$_6$-C$_{10}$)aryl(C$_1$-C$_3$)alkyl, (C$_1$-C$_{12}$)alkoxy, (C$_3$-C$_{12}$)cycloalkoxy, (C$_6$-C$_{12}$)bicycloalkoxy, (C$_7$-C$_{14}$)tricycloalkoxy, (C$_6$-C$_{10}$)aryloxy(C$_1$-C$_3$)alkyl or (C$_6$-C$_{10}$)aryloxy.

9. The composition according to claim 1, wherein the monomer of formula (I) is selected from the group consisting of:

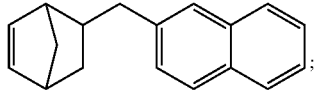

2-(bicyclo[2.2.1]hept-5-en-2-ylmethyl)naphthalene

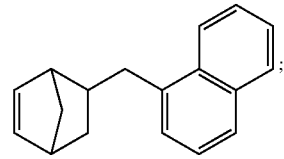

1-(bicyclo[2.2.1]hept-5-en-2-ylmethyl)naphthalene

-continued

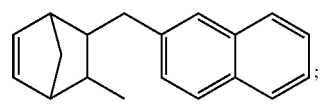

2-((3-methylbicyclo[2.2.1]hept-5-en-2-yl)methyl)naphthalene

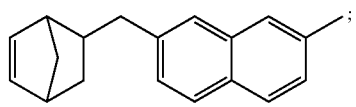

2-(bicyclo[2.2.1]hept-5-en-2-ylmethyl)-7-methylnaphthalene

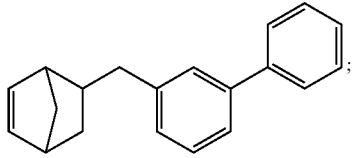

5-([1,1'-biphenyl]-3-ylmethyl)bicyclo[2.2.1]hept-2-ene

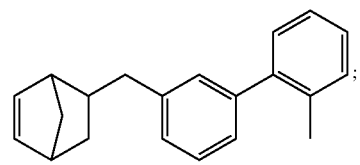

5-((2'-methyl-[1,1'-biphenyl]-3-yl)methyl)bicyclo[2.2.1]hept-2-ene

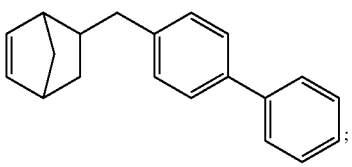

5-([1,1'-biphenyl]-4-ylmethyl)bicyclo[2.2.1]hept-2-ene

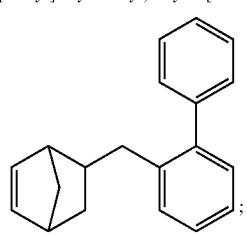

5-([1,1'-biphenyl]-2-ylmethyl)bicyclo[2.2.1]hept-2-ene

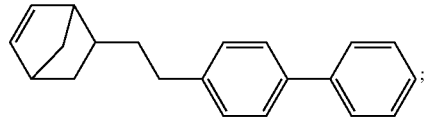

5-(2-([1,1'-biphenyl]-4-yl)ethyl)bicyclo[2.2.1]hept-2-ene
(NBEtPhPh)

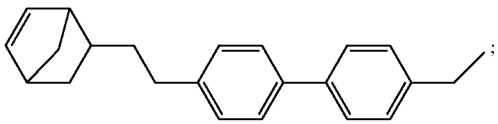

5-(2-(4'-ethyl-[1,1'-biphenyl]-4-yl)ethyl)bicyclo[2.2.1]hept-2-ene

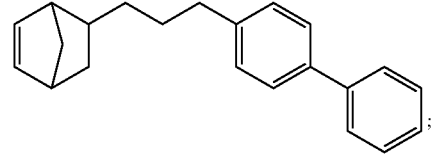

5-(3-([1,1'-biphenyl]-4-yl)propyl)bicyclo[2.2.1]hept-2-ene

-continued

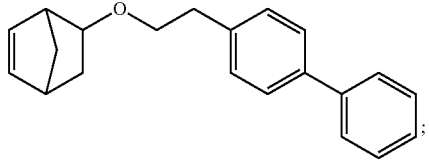

5-(2-([1,1'-biphenyl]-4-yl)ethoxy)bicyclo[2.2.1]hept-2-ene

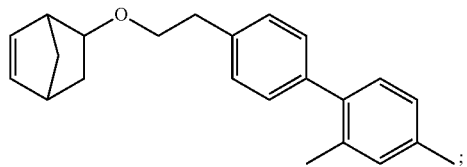

5-(2-(2,4'-dimethyl-[1,1'-biphenyl]-4-yl)ethoxy)bicyclo[2.2.1]hept-2-ene

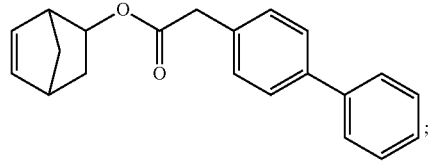

bicyclo[2.2.1]hept-5-en-2-yl 2-([1,1'-biphenyl]-4-yl)acetate

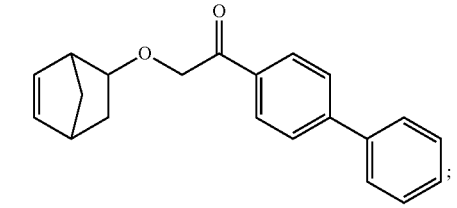

bicyclo[2.2.1]hept-5-en-2-ylmethyl [1,1'-biphenyl]-4-carboxylate

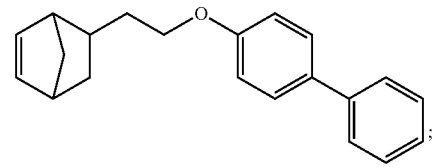

5-(2-([1,1'-biphenyl]-4-yloxy)ethyl)bicyclo[2.2.1]hept-2-ene

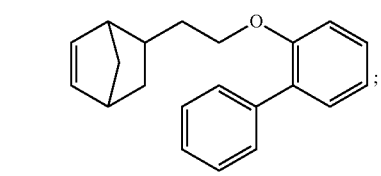

5-(2-([1,1'-biphenyl]-2-yloxy)ethyl)bicyclo[2.2.1]hept-2-ene
(NBEtOPhPh)

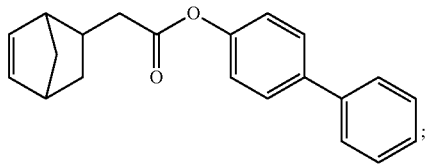

[1,1'-biphenyl]-4-yl 2-(bicyclo[2.2.1]hept-5-en-2yl)acetate

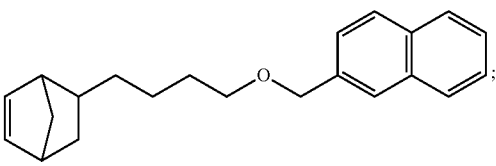

2-((4-bicyclo[2.2.1]hept-5-en-2-yl)butoxy)methyl)napthalene

-continued

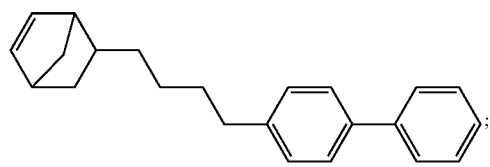

5-(4-([1,1'-biphenyl]-4-yl)butyl)(bicyclo[2.2.1]hept-5-ene

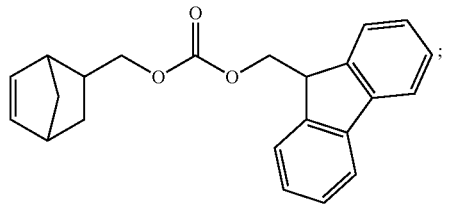

(9H-fluoren-8-yl)methyl
(bicyclo[2.2.1]hept-5-en-2-ylmethyl) carbonate

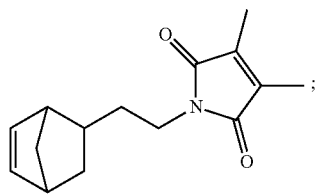

1-(4-bicyclo[2.2.1]hept-5-en-2-ylethyl)-
3,4-dimethyl-1H-pyrrole-2,5-dione

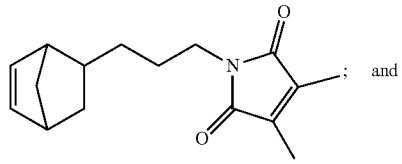 and 1-(4-bicyclo[2.2.1]hept-5-en-2-ylpropyl)-
3,4-dimethyl-1H-pyrrole-2,5-dione

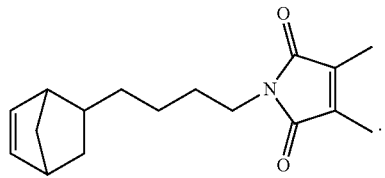

1-(4-bicyclo[2.2.1]hept-5-en-2-ylbutyl)-
3,4-dimethyl-1H-pyrrole-2,5-dione

10. The composition according to claim 1, wherein the monomer of formula (II) is selected from the group consisting of:

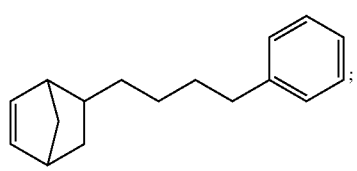

5-(4-phenylbutyl)bicyclo[2.2.1]hept-2-ene

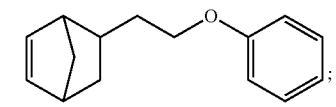

5-(2-phenoxyethyl)bicyclo[2.2.1]hept-2-ene

-continued

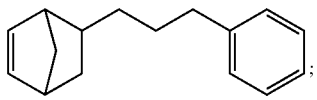

5-(3-phenylpropyl)bicyclo[2.2.1]hept-2-ene

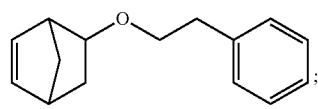

5-phenethoxybicyclo[2.2.1]hept-2-ene

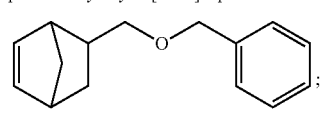

5-((benzyloxy)methyl)bicyclo[2.2.1]hept-2-ene

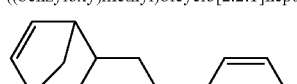

5-(phenoxymethyl)bicyclo[2.2.1]hept-2-ene

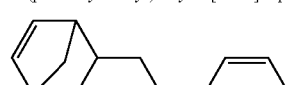

5-phenethylbicyclo[2.2.1]hept-2-ene

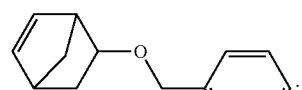

5-(benzyloxy)bicyclo[2.2.1]hept-2-ene

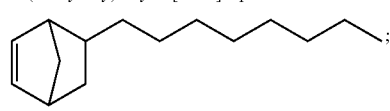

5-octylbicyclo[2.2.1]hept-2-ene (OctNB)

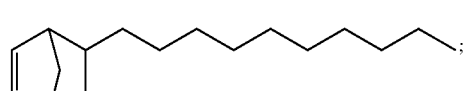

5-decylbicyclo[2.2.1]hept-2-ene (DecNB)

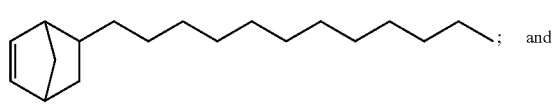 and 5-dodecylbicyclo[2.2.1]hept-2-ene (DoDecNB)

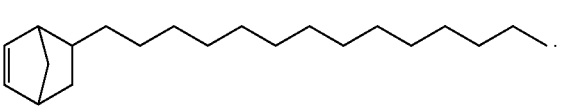

5-tetradecylbicyclo[2.2.1]hept-2-ene (TetraDecNB)

11. The composition according to claim 1, wherein the monomer of formula (III) is selected from the group consisting of:

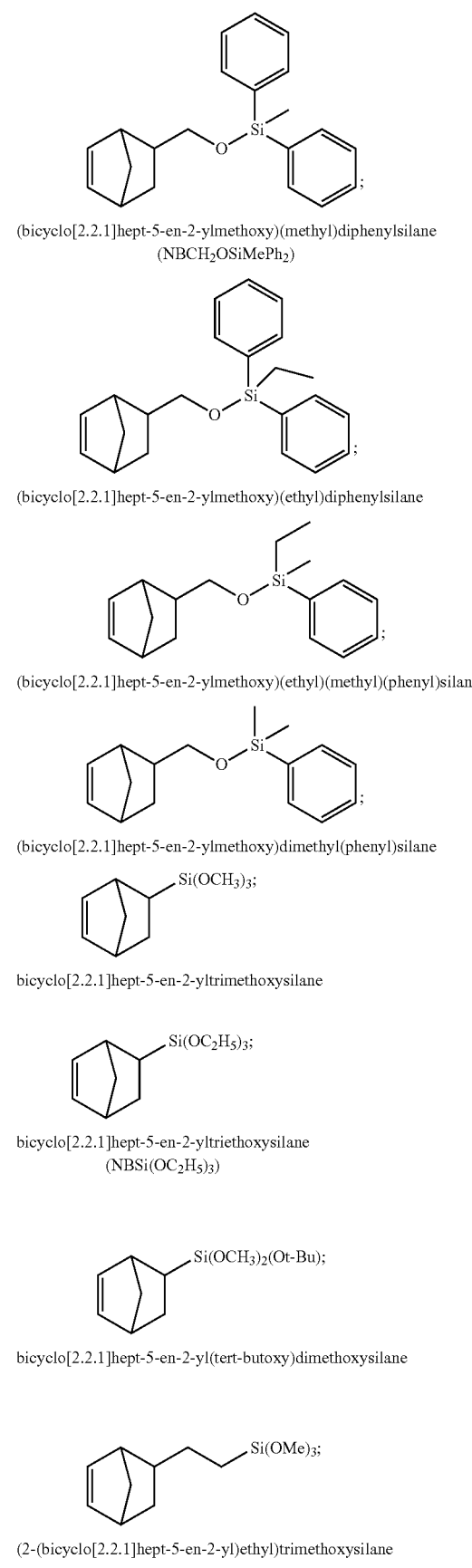

(bicyclo[2.2.1]hept-5-en-2-ylmethoxy)(methyl)diphenylsilane
(NBCH₂OSiMePh₂)

(bicyclo[2.2.1]hept-5-en-2-ylmethoxy)(ethyl)diphenylsilane (bicyclo[2.2.1]hept-5-en-2-ylmethoxy)(ethyl)(methyl)(phenyl)silane (bicyclo[2.2.1]hept-5-en-2-ylmethoxy)dimethyl(phenyl)silane bicyclo[2.2.1]hept-5-en-2-yltrimethoxysilane bicyclo[2.2.1]hept-5-en-2-yltriethoxysilane
(NBSi(OC₂H₅)₃)

bicyclo[2.2.1]hept-5-en-2-yl(tert-butoxy)dimethoxysilane (2-(bicyclo[2.2.1]hept-5-en-2-yl)ethyl)trimethoxysilane

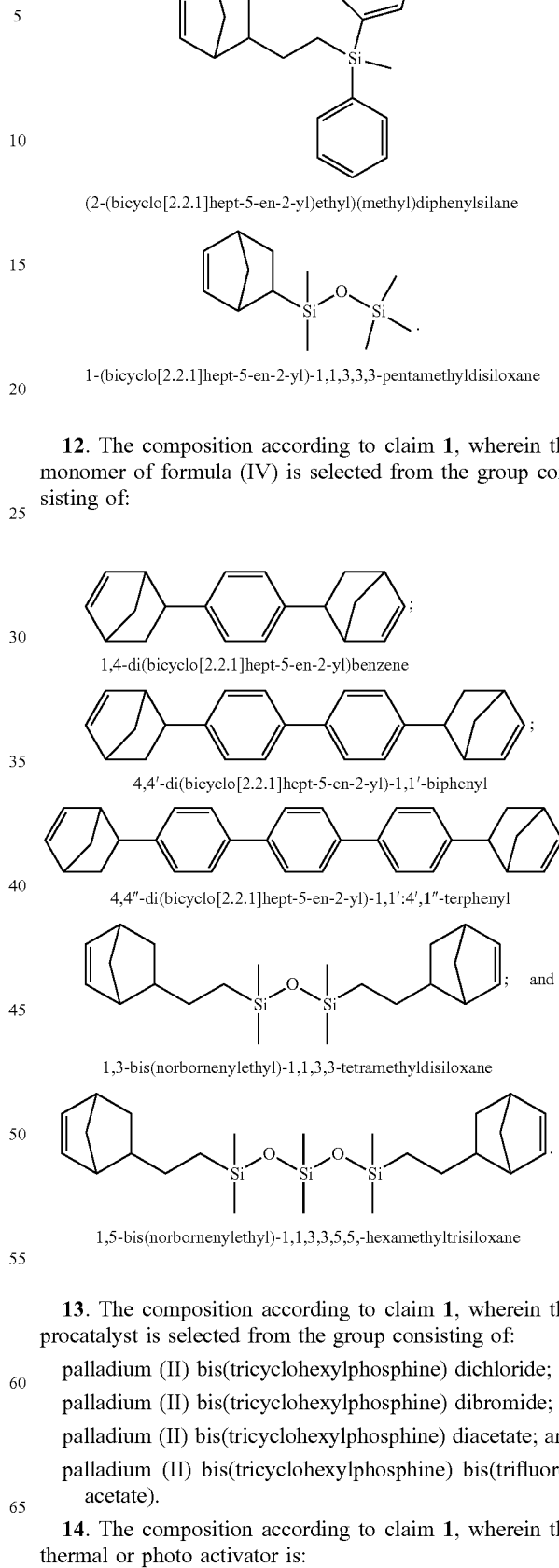

(2-(bicyclo[2.2.1]hept-5-en-2-yl)ethyl)(methyl)diphenylsilane 1-(bicyclo[2.2.1]hept-5-en-2-yl)-1,1,3,3,3-pentamethyldisiloxane 12. The composition according to claim 1, wherein the monomer of formula (IV) is selected from the group consisting of:

1,4-di(bicyclo[2.2.1]hept-5-en-2-yl)benzene 4,4′-di(bicyclo[2.2.1]hept-5-en-2-yl)-1,1′-biphenyl 4,4″-di(bicyclo[2.2.1]hept-5-en-2-yl)-1,1′:4′,1″-terphenyl 1,3-bis(norbornenylethyl)-1,1,3,3-tetramethyldisiloxane 1,5-bis(norbornenylethyl)-1,1,3,3,5,5,-hexamethyltrisiloxane 13. The composition according to claim 1, wherein the procatalyst is selected from the group consisting of:
palladium (II) bis(tricyclohexylphosphine) dichloride;
palladium (II) bis(tricyclohexylphosphine) dibromide;
palladium (II) bis(tricyclohexylphosphine) diacetate; and
palladium (II) bis(tricyclohexylphosphine) bis(trifluoroacetate).

14. The composition according to claim 1, wherein the thermal or photo activator is:

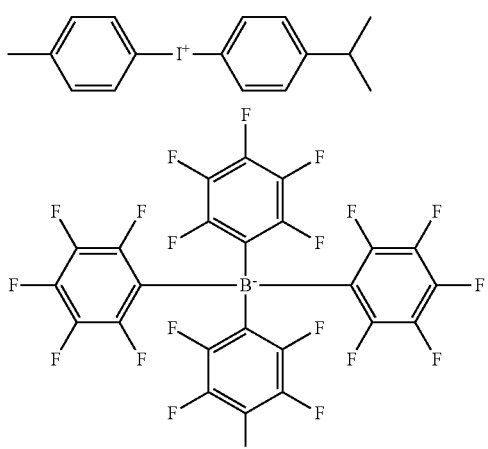

tolylcumyliodonium-tetrakis pentafluorophenylborate.

15. The composition according to claim 1, which contains 5-(2-([1,1'-biphenyl]-4-yloxy)ethyl)bicyclo[2.2.1]hept-2-ene (NBEtOPhPh), 5-phenethylbicyclo[2.2.1]hept-2-ene (PENB), palladium (II) bis(tricyclohexyl-phosphine) diacetate and tolylcumyliodonium-tetrakis pentafluorophenylborate.

16. A kit for forming a substantially transparent film comprising:
one or more monomers of formula (I) or formula (II), a procatalyst and a thermal of photoactivator, wherein:
a) said monomer of formula (I) is:

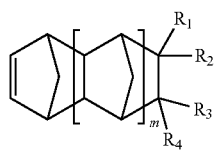

wherein:
m is an integer 0, 1 or 2;
at least one of $R_1$, $R_2$, $R_3$ and $R_4$ is selected from the group consisting of:
a group of formula (A):

—X-Aryl  (A);

a group of formula (A1):

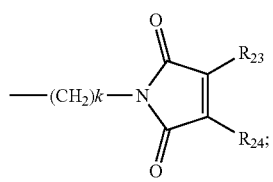

a group of formula (A2):

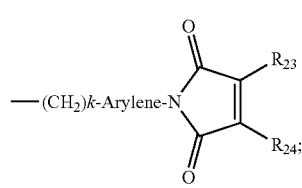

a group of formula (A3):

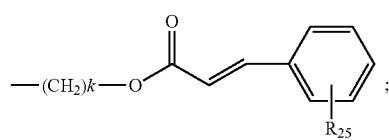

and
a group of formula (A4):

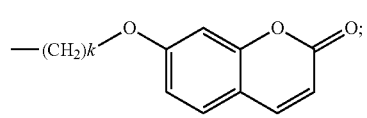

wherein:
X is selected from the group consisting of:
O, C(O)O, OC(O), S, $(CR_5R_6)_a$, $O(CR_5R_6)_a$, $(CR_5R_6)_aO$, $C(O)O(CR_5R_6)_a$, $(CR_5R_6)_aC(O)O$, $OC(O)(CR_5R_6)_a$, $(CR_5R_6)_aOC(O)$, $S(CR_5R_6)_a$, $(CR_5R_6)_aS$, $(SiR_5R_6)_a$, $O(SiR_5R_6)_a$, $(SiR_5R_6)_aO$, where $R_5$ and $R_6$ are the same or different and each independently represents hydrogen, methyl, ethyl, linear or branched $(C_3-C_{12})$alkyl and a is an integer from 0 to 12, inclusive;
Aryl is substituted or unsubstituted biphenyl, substituted or unsubstituted naphthyl, substituted or unsubstituted terphenyl, substituted or unsubstituted anthracenyl substituted or unsubstituted fluorenyl;
k is an integer from 1 to 12;
$R_{23}$, $R_{24}$ and $R_{25}$ are the same or different and each independently selected from the group consisting of hydrogen, methyl, ethyl, linear or branched $(C_3-C_{12})$ alkyl, perfluoro$(C_1-C_{12})$alkyl, methoxy, ethoxy, linear or branched $(C_3-C_{12})$alkoxy, $(C_3-C_{12})$cycloalkyl, $(C_6-C_{12})$bicycloalkyl, $(C_7-C_{14})$tricycloalkyl, $(C_6-C_{10})$aryl, $(C_6-C_{10})$aryl$(C_1-C_6)$alkyl, perfluoro$(C_6-C_{10})$aryl and perfluoro$(C_6-C_{10})$aryl$(C_1-C_3)$alkyl; or
$R_{23}$ and $R_{24}$ taken together with the intervening carbon atoms to which they are attached to form a substituted or unsubstituted $(C_5-C_{14})$cyclic, $(C_5-C_{14})$bicyclic or $(C_5-C_{14})$tricyclic ring; and Arylene is substituted or unsubstituted bivalent $(C_6-C_{14})$aryl;
the remaining $R_1$, $R_2$, $R_3$ and $R_4$ are the same or different and each independently selected from the group consisting of hydrogen, halogen, a hydrocarbyl or halohydrocarbyl group selected from methyl, ethyl, linear or branched $(C_3-C_{12})$alkyl, hydroxy$(C_1-C_{12})$alkyl, perfluoro$(C_1-C_{12})$alkyl, $(C_3-C_{12})$cycloalkyl, $(C_6-C_{12})$bicycloalkyl, $(C_7-C_{14})$tricycloalkyl, $(C_6-C_{10})$aryl, $(C_6-C_{10})$aryl$(C_1-C_6)$alkyl, perfluoro$(C_6-C_{10})$aryl and perfluoro$(C_6-C_{10})$aryl$(C_1-C_3)$alkyl; or one of $R_1$ and $R_2$ taken together with one of $R_3$ and $R_4$ and the carbon atoms to which they are attached to form a substituted or unsubstituted $(C_5-C_{14})$cyclic, $(C_5-C_{14})$ bicyclic or $(C_5-C_{14})$tricyclic ring;

b) said monomer of formula (II) is:

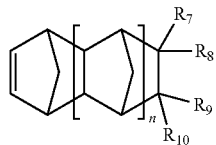

(II)

wherein:

n is an integer 0, 1 or 2;

$R_7$, $R_8$, $R_9$ and $R_{10}$ are the same or different and each independently selected from the group consisting of hydrogen, halogen, a hydrocarbyl or halohydrocarbyl group selected from methyl, ethyl, linear or branched $(C_3-C_{16})$alkyl, perfluoro$(C_1-C_{12})$alkyl, $(C_3-C_{12})$cycloalkyl, $(C_6-C_{12})$bicycloalkyl, $(C_7-C_{14})$tricycloalkyl, $(C_6-C_{10})$aryl, $(C_6-C_{10})$aryl$(C_1-C_6)$alkyl, perfluoro$(C_6-C_{10})$aryl, perfluoro$(C_6-C_{10})$aryl$(C_1-C_3)$alkyl and a group of formula (B):

 (B)

wherein:

Y is selected from the group consisting of:
$(CR_5R_6)_a$, $O(CR_5R_6)_a$ and $(CR_5R_6)_aO$, where a, $R_5$ and $R_6$ are as defined above;

$Aryl_1$ is phenyl or phenyl substituted with one or more $(C_1-C_6)$alkyl;

wherein said monomer of formula (I) is having a refractive index of at least 1.5, said second monomer of formula (II) is having a refractive index less than 1.6 and viscosity below 100 centipoise, and said composition is in a clear liquid form at room temperature; and wherein said thermal or photoactivator is of the formula (V):

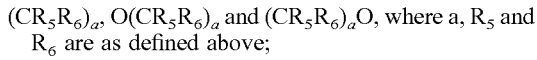

wherein $Aryl_1$ and $Aryl_2$ are the same or different and are independently selected from the group consisiting of phenyl and substituted phenyl with one or more $(C_1-C_6)$alkyl;

Hal is iodine or bromine; and $An^\ominus$ is a weakly coordinating anion.

17. The kit according to claim 16, which contains at least two monomers wherein first monomer is of formula (I) and second monomer is of formula (II), wherein monomer of formula (I) is completely soluble in monomer of formula (II), and when said composition is heated to a temperature of from 50° C. to 100° C. for a sufficient length of time it forms a substantially transparent film having at least 90 percent of visible light transmission.

18. The kit according to claim 16, wherein said composition further comprises one or more monomers selected from monomer of formula (III) or monomer of formula (IV), wherein said monomer of formula (III) is:

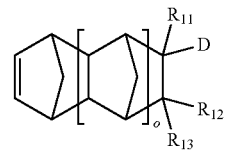

(III)

wherein:

o is an integer from 0 to 2, inclusive;

D is $SiR_{14}R_{15}R_{16}$ or a group selected from:

 (E);

 (F); and

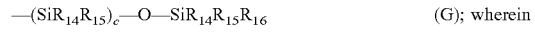 (G); wherein c is an integer from 1 to 10, inclusive, and where one or more of $CH_2$ is optionally substituted with $(C_1-C_{10})$alkyl, $(C_1-C_{10})$perfluoroalkyl or $(C_6-C_{14})$aryl;

$R_{11}$, $R_{12}$ and $R_{13}$ are the same or different and independently of each other selected from hydrogen, halogen and hydrocarbyl, where hydrocarbyl is selected from methyl, ethyl, linear or branched $(C_3-C_{12})$alkyl, $(C_3-C_{12})$cycloalkyl, $(C_6-C_{12})$bicycloalkyl, $(C_7-C_{14})$tricycloalkyl, $(C_6-C_{10})$aryl, $(C_6-C_{10})$aryl$(C_1-C_3)$alkyl, $(C_1-C_{12})$alkoxy, $(C_3-C_{12})$cycloalkoxy, $(C_6-C_{12})$bicycloalkoxy, $(C_7-C_{14})$tricycloalkoxy, $(C_6-C_{10})$aryloxy$(C_1-C_3)$alkyl or $(C_6-C_{10})$aryloxy; and $R_{14}$, $R_{15}$ and $R_{16}$ are each independently of one another methyl, ethyl, linear or branched $(C_3-C_9)$alkyl, substituted or unsubstituted $(C_6-C_{14})$aryl, methoxy ethoxy, linear or branched $(C_3-C_9)$alkoxy or substituted or unsubstituted $(C_6-C_{14})$aryloxy;

said monomer of formula (IV) is:

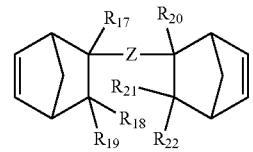

(IV)

wherein:

Z is selected from the group consisting of substituted or unsubstituted $(C_1-C_{12})$alkylene, $-(CH_2)_dO(CH_2)_e-$, $-(CH_2)_d(SiR_{26}R_{27})(OSiR_{28}R_{29})/(CH_2)_e-$ where d, e and f are independently integers from 0 to 6, inclusive, $R_{26}$, $R_{27}$, $R_{28}$ and $R_{29}$ are the same or different and independently of each other selected from methyl, ethyl, linear or branched $(C_3-C_{12})$alkyl, and an arylene selected from the following:

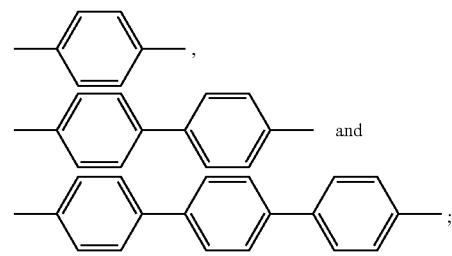

$R_{17}$, $R_{18}$, $R_{19}$, $R_{20}$, $R_{21}$ and $R_{22}$ are the same or different and independently of each other selected from hydrogen, halogen and hydrocarbyl, where hydrocarbyl is selected from methyl, ethyl, linear or branched ($C_3$-$C_{12}$)alkyl, ($C_3$-$C_{12}$)cycloalkyl, ($C_6$-$C_{12}$)bicycloalkyl, ($C_7$-$C_{14}$)tricycloalkyl, ($C_6$-$C_{10}$)aryl, ($C_6$-$C_{10}$)aryl($C_1$-$C_3$)alkyl, ($C_1$-$C_{12}$)alkoxy, ($C_3$-$C_{12}$)cycloalkoxy, ($C_6$-$C_{12}$)bicycloalkoxy, ($C_7$-$C_{14}$)tricycloalkoxy, ($C_6$-$C_{10}$)aryloxy($C_1$-$C_3$)alkyl or ($C_6$-$C_{10}$)-aryloxy.

19. The kit according to claim 16, which contains 5-(2-([1,1'-biphenyl]-2-yloxy)ethyl)bicyclo[2.2.1]hept-2-ene (NBEtOPhPh), 5-phenethylbicyclo[2.2.1]hept-2-ene (PENB), palladium (II) bis(tricyclohexylphosphine) diacetate and tolylcumyliodonium-tetrakis pentafluorophenylborate.

20. A composition comprising one or more monomers of formula (I) or formula (II), a procatalyst and a thermal or photoactivator, wherein:

a) said monomer of formula (I) is:

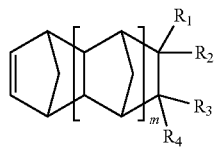

(I)

wherein:

m is an integer 0, 1 or 2;

at least one of $R_1$, $R_2$, $R_3$ and $R_4$ is selected from the group consisting of:

a group of formula (A):

—X-Aryl          (A);

a group of formula (A1):

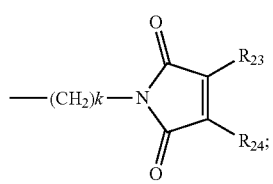

(A1)

a group of formula (A2):

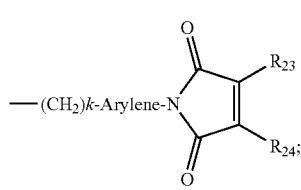

(A2)

a group of formula (A3):

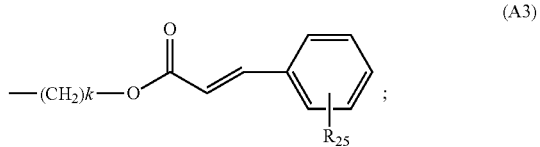

(A3)

and a group of formula (A4):

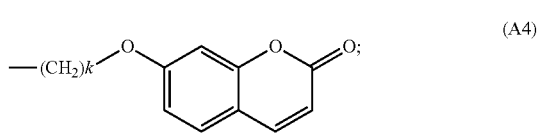

(A4)

wherein:

X is selected from the group consisting of:
O, CO, C(O)O, OC(O), OC(O)O, S, $(CR_5R_6)_a$, $O(CR_5R_6)_a$, $(CR_5R_6)_aO$, $C(O)(CR_5R_6)_a$, $(CR_5R_6)_aC(O)$, $C(O)O(CR_5R_6)_a$, $(CR_5R_6)_aC(O)O$, $OC(O)(CR_5R_6)_a$, $(CR_5R_6)_aOC(O)$, $(CR_5R_6)_aOC(O)O$, $(CR_5R_6)_aOC(O)O(CR_5R_5)_a$, $OC(O)O(CR_5R_6)_a$, $S(CR_5R_6)_a$, $(CR_5R_6)_aS$, $(SiR_5R_6)_a$, $O(SiR_5R_6)_a$, $(SiR_5R_6)_aO$, where $R_5$ and $R_6$ are the same or different and each independently represents hydrogen, methyl, ethyl, linear or branched ($C_3$-$C_{12}$)alkyl and a is an integer from 0 to 12, inclusive;

Aryl is substituted or unsubstituted biphenyl, substituted or unsubstituted naphthyl, substituted or unsubstituted terphenyl, substituted or unsubstituted anthracenyl substituted or unsubstituted fluorenyl;

k is an integer from 1 to 12;

$R_{23}$, $R_{24}$ and $R_{25}$ are the same or different and each independently selected from the group consisting of hydrogen, methyl, ethyl, linear or branched ($C_3$-$C_{12}$) alkyl, perfluoro($C_1$-$C_{12}$)alkyl, methoxy, ethoxy, linear or branched ($C_3$-$C_{12}$)alkoxy, ($C_3$-$C_{12}$)cycloalkyl, ($C_6$-$C_{12}$)bicycloalkyl, ($C_7$-$C_{14}$)tricycloalkyl, ($C_6$-$C_{10}$)aryl, ($C_6$-$C_{10}$)aryl($C_1$-$C_6$)alkyl, perfluoro($C_6$-$C_{10}$)aryl and perfluoro($C_6$-$C_{10}$)aryl($C_1$-$C_3$)alkyl; or $R_{23}$ and $R_{24}$ taken together with the intervening carbon atoms to which they are attached to form a substituted or unsubstituted ($C_5$-$C_{14}$)cyclic, ($C_5$-$C_{14}$)bicyclic or ($C_5$-$C_{14}$)tricyclic ring; and Arylene is substituted or unsubstituted bivalent ($C_6$-$C_{14}$)aryl;

the remaining $R_1$, $R_2$, $R_3$ and $R_4$ are the same or different and each independently selected from the group consisting of hydrogen, halogen, a hydrocarbyl or halohydrocarbyl group selected from methyl, ethyl, linear or branched ($C_3$-$C_{12}$)alkyl, perfluoro($C_1$-$C_{12}$)alkyl, ($C_3$-$C_{12}$)cycloalkyl, ($C_6$-$C_{12}$)bicycloalkyl, ($C_7$-$C_{14}$)tricycloalkyl, ($C_6$-$C_{10}$)aryl, ($C_6$-$C_{10}$)aryl($C_1$-$C_6$)alkyl, perfluoro($C_6$-$C_{10}$)aryl and perfluoro($C_6$-$C_{10}$)aryl($C_1$-$C_3$) alkyl; or one of $R_1$ and $R_2$ taken together with one of $R_3$ and $R_4$ and the carbon atoms to which they are attached to form a substituted or unsubstituted ($C_5$-$C_{14}$)cyclic, ($C_5$-$C_{14}$) bicyclic or ($C_5$-$C_{14}$)tricyclic ring;

b) said monomer of formula (II) is:

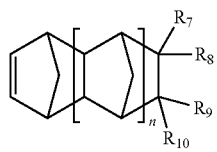
(II)

wherein:

n is an integer 0, 1 or 2;

$R_7$, $R_8$, $R_9$ and $R_{10}$ are the same or different and each independently selected from the group consisting of hydrogen, halogen, a hydrocarbyl or halohydrocarbyl group selected from methyl, ethyl, linear or branched ($C_3$-$C_{16}$)alkyl, perfluoro($C_1$-$C_{12}$)alkyl, ($C_3$-$C_{12}$)cycloalkyl, ($C_6$-$C_{12}$)bicycloalkyl, ($C_7$-$C_{14}$)tricycloalkyl, ($C_6$-$C_{10}$)aryl, ($C_6$-$C_{10}$)aryl($C_1$-$C_6$)alkyl, perfluoro($C_6$-$C_{10}$)aryl, perfluoro($C_6$-$C_{10}$)aryl($C_1$-$C_3$)alkyl and a group of formula (B):

—Y-$Aryl_1$ (B)

wherein:

Y is selected from the group consisting of: $(CR_5R_6)_a$, $O(CR_5R_6)_a$ and $(CR_5R_6)_aO$, where a, $R_5$ and $R_6$ are as defined above;

$Aryl_1$ is phenyl or phenyl substituted with one or more ($C_1$-$C_6$)alkyl; wherein said monomer of formula (I) is having a refractive index greater than or equal to 1.6, said monomer of formula (II) is having a refractive index less than 1.6 and viscosity below 100 centipoise, and wherein said monomer of formula (I) is completely miscible with said second monomer of formula (II) and forms a clear solution; and when said composition is exposed to a temperature in the range of from 50° C. to 100° C. forms a substantially transparent film having a transmission higher than 90 percent of the visible light; and wherein said thermal or photoactivator is of the formula (V):

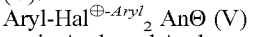

wherein $Aryl_1$ and $Aryl_2$ are the same or different and are independently selected from the group consisting of phenyl and substituted phenyl with one or more ($C_1$-$C_6$)alkyl;

Hal is iodine or bromine; and

AnΘ is a weakly coordinating anion.

* * * * *